United States Patent [19]

Kawaguchi et al.

[11] Patent Number: 4,952,985
[45] Date of Patent: Aug. 28, 1990

[54] ELECTROPHOTOGRAPHIC COPYING APPARATUS WITH MONITORING OF SCANNING SPEED

[75] Inventors: Toshikazu Kawaguchi; Kenzo Nagata, both of Osaka, Japan

[73] Assignee: Minolta Camera Kabushiki Kaisha, Osaka, Japan

[21] Appl. No.: 274,506

[22] Filed: Nov. 21, 1988

[30] Foreign Application Priority Data

| Nov. 27, 1987 | [JP] | Japan | 62-301318 |
| Dec. 19, 1987 | [JP] | Japan | 62-322378 |
| Dec. 29, 1987 | [JP] | Japan | 62-332692 |

[51] Int. Cl.$^5$ ............................................. G03G 15/00
[52] U.S. Cl. ..................................... 355/206; 355/235
[58] Field of Search .............................. 355/203–209, 355/233–235, 50, 51

[56] References Cited

U.S. PATENT DOCUMENTS

| 4,561,764 | 12/1985 | Sugiura | 355/235 |
| 4,561,771 | 12/1985 | Sugiura | 355/235 |
| 4,568,171 | 2/1986 | Ikenoue | 355/235 |
| 4,819,025 | 4/1989 | Takahaski et al. | 355/206 |

FOREIGN PATENT DOCUMENTS

| 58-54435 | 12/1983 | Japan . |  |
| 61-63831 | 4/1986 | Japan . |  |
| 61-138248 | 6/1986 | Japan | 355/235 |
| 62-109037 | 5/1987 | Japan | 355/234 |

Primary Examiner—Joan H. Pendegrass
Attorney, Agent, or Firm—Price, Gess & Ubell

[57] ABSTRACT

An electrophotographic copying apparatus in which a speed of scanning system is detected and when the detected speed exceeds a predetermined range till paper feed means feeds a paper to a photosensitive drum after the scanning system starts its operation, the paper is stopped just before the photosensitive drum to repeat scanning again, thereby transient speed fluctuation causes are eliminated and the copying operation is recovered automatically to prevent a poor image forming, and further, the number of the try to scan is counted and, when it exceeds a predetermined number, the paper is discharged as it is in blank to save trouble of removing the paper, and also driving torque of the scanning system is detected to warn when it exceeds a predetermined range and thereby warn the user's overload on an original table to prevent a poor image forming.

28 Claims, 26 Drawing Sheets

ELECTROPHOTOGRAPHIC COPYING APPARATUS WITH MONITORING OF SCANNING SPEED

BACKGROUND OF THE INVENTION

1. Field of the Invention

The present invention relates to an electrophotographic copying apparatus, particularly, it relates to an electrophotographic copying apparatus designed to prevent poor image forming due to an abnormal scanning speed of an original.

2. Description of the Prior Art

Conventionally, in an electrophotographic copying apparatus, in order to scan and expose an original to project an image of the original on a photosensitive surface moving at a constant speed, an optical scanning system including a light source and the original are moved relatively. As a system for scanning and exposing the original, an original moving system in which the original itself or an original table carrying the original are moved and an optical system moving system in which the optical scanning system is moved relative to the original stationed are known. In either case, the scanning speed of the original must be constant. That is, the scanning speed must always be kept constant to obtain a good image since the fluctuations of scanning speed can cause the image formed on the photosensitive surface to deform.

Therefore, in Japanese Patent Application Laid Open No. 61-63831, a technique to stop the optical scanning system by detecting its moving speed as abnormal when it is lower than a predetermined value is disclosed.

It is definite that the technique disclosed Japanese Publication can prevent a deformed image from being outputted when the scanning speed fluctuates. However, among the causes of fluctuations of scanning speed, there are many causes which can be dissolved instantly. For example, such fluctuations of scanning speed as in the case where torque of a driving system fails due to a transient power voltage drop or the case, in the original moving system, where the user has applied excessive load on the original itself or on the original table are transient ones which can be resolved immediately. The aforesaid technique which merely stops scanning when the scanning speed has changed due to such a transient cause makes it inconvenient to operate the copying apparatus.

In order to maintain the scanning speed always constant, though it is also possible to detect the scanning speed and change the voltage value to be applied to the driving system responsive to the detected speed, a range which can be corrected by changing the applied voltage value is limited and exceeding the limit will also result in a poor image forming.

SUMMARY OF THE INVENTION

The present invention has been devised in view of the points aforementioned, therefore, it is an object thereof to provide an electrophotographic copying apparatus capable of recovering automatically by stopping the feeding of paper and rescanning the original, when the speed fluctuation of a scanning system exceeds a predetermined range before the paper feed starts after the start of scanning of an original by the scanning system, provided that the scanning speed fluctuation is transient.

It is a further object of the present invention to provide an electrophotographic copying apparatus capable of providing a warning that it has deviated from a predetermined range by detecting a driving torque of the scanning system of the original.

The above and further objects and features of the invention will more fully be apparent from the following detailed description with accompanying drawings.

DESCRIPTION OF THE PREFERRED EMBODIMENTS

One embodiment of the present invention will be explained with reference to the drawings as follows.

{Preliminary Explanation of an Embodied Copying Apparatus}

Figure 1:
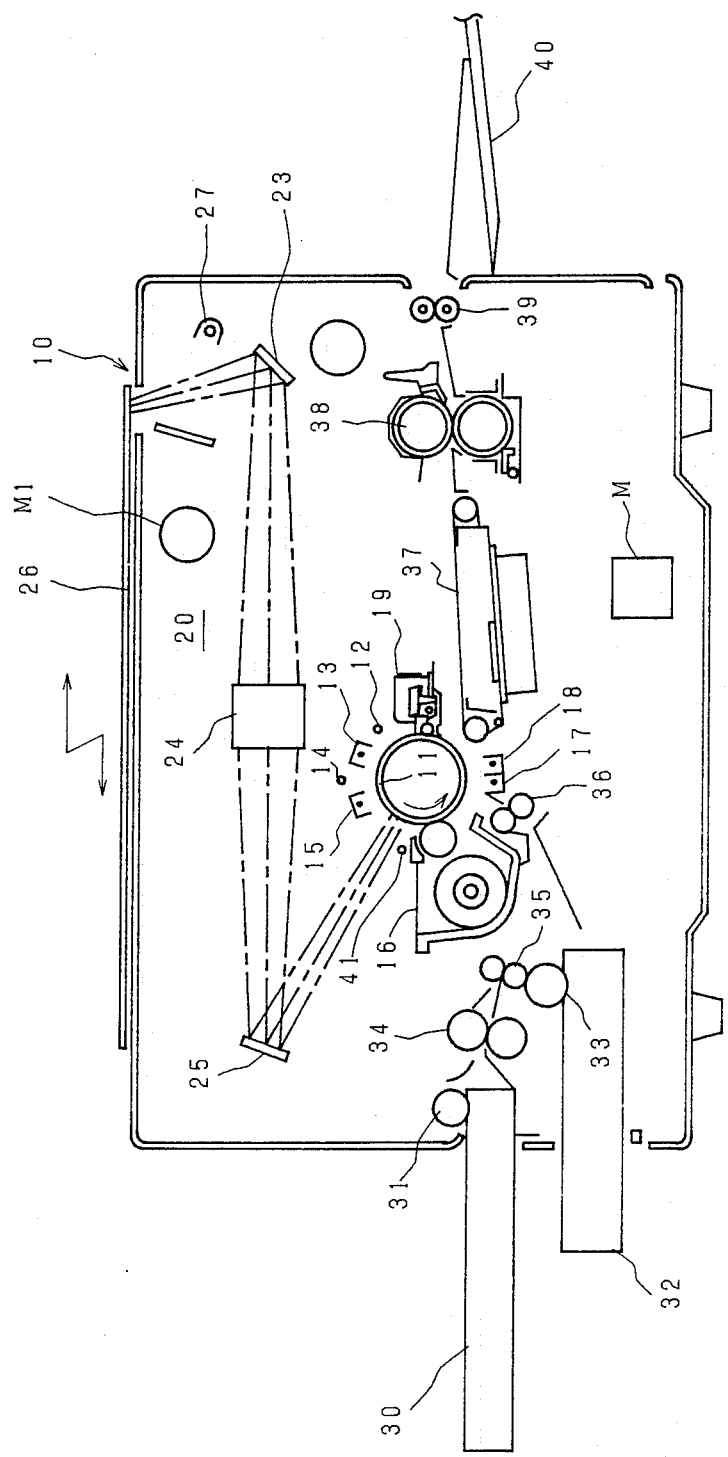
FIG. 1 is a schematic sectional view showing the configuration of a copying apparatus according to one embodiment of the present invention.

FIG. 1 is a sectional view schematically showing the configuration of an original table moving type copying apparatus 10 according to the embodiment, through which the configuration of the copying apparatus 10 will be briefly explained.

Approximately in the center of the copying apparatus 10, there is provided a photosensitive drum 11 rotatable counterclockwise. Around the photosensitive drum 11, in order in the rotational direction, a main eraser lamp 12, sub-charger 13, sub-eraser lamp 14, main charger 15, intermediate eraser 41, developing unit 16, transfer charger 17, separation charger 18 of the copying apparatus and a blade-type cleaning unit 19 are disposed successively. A photosensitive layer is formed on the surface of the photosensitive drum 11. The photosensitive layer is charged uniformly by passing through the eraser lamps 12, 14 and chargers 13, 15 and receives an image exposure from a scanning optical system 20. By the intermediate eraser 41, unnecessary portions are exposed and discharged. In the present embodiment, the intermediate eraser 41 is constituted by a number of LEDs arranged axially to the photosensitive drum 11. By lighting any LED among a group of the LEDs, unnecessary electrostatic latent images formed on the photosensitive layer are erased.

The scanning optical system 20 is constituted by a movable original glass 26, an exposure lamp 27 which is a stationary light source, mirrors 23, 25 and lens 24.

The original glass 26 constitutes an original table and is driven by a DC motor M1 so as to move and scan rightward at a speed v/m (where m: copying magnification) with respect to a peripheral speed v (constant irrespective of equi- or variable-magnification) of the photosensitive drum 11.

While, on the left side of the copying apparatus, paper feed cassettes 30, 32 including paper feed rollers 31, 33 respectively are disposed detachably. A transporting passage of the copying apparatus is constituted by pairs of rollers 34, 35, a pair of timing-rollers 36, transport belt 37, fixing unit 38 and a pair of discharge rollers 39. In the aforesaid configuration, a main driving system comprising the photosensitive drum 11, transport rollers 34, 35, transport belt 37, fixing unit 38 and so on is driven by a main motor M. As the main motor M, a synchronous motor which rotates at a constant speed dependent on an AC power frequency is used.

The optical scanning system 20 is moved by the DC motor M1 where speed is controllable and constituted independently in mechanism from the main driving system. In the present embodiment, the original glass 26 for carrying the original is movable against the stationary light source. The present invention, however, is not limited to the original table moving type, it can also be applied, for example, in the case where only the original is held by a pair of rollers and moved relative to the light source, and in the case where the light source or the like is moved under the stationary original.

{Relative Moving Speed Detecting Means of the Original and Light Source}

Figure 2:
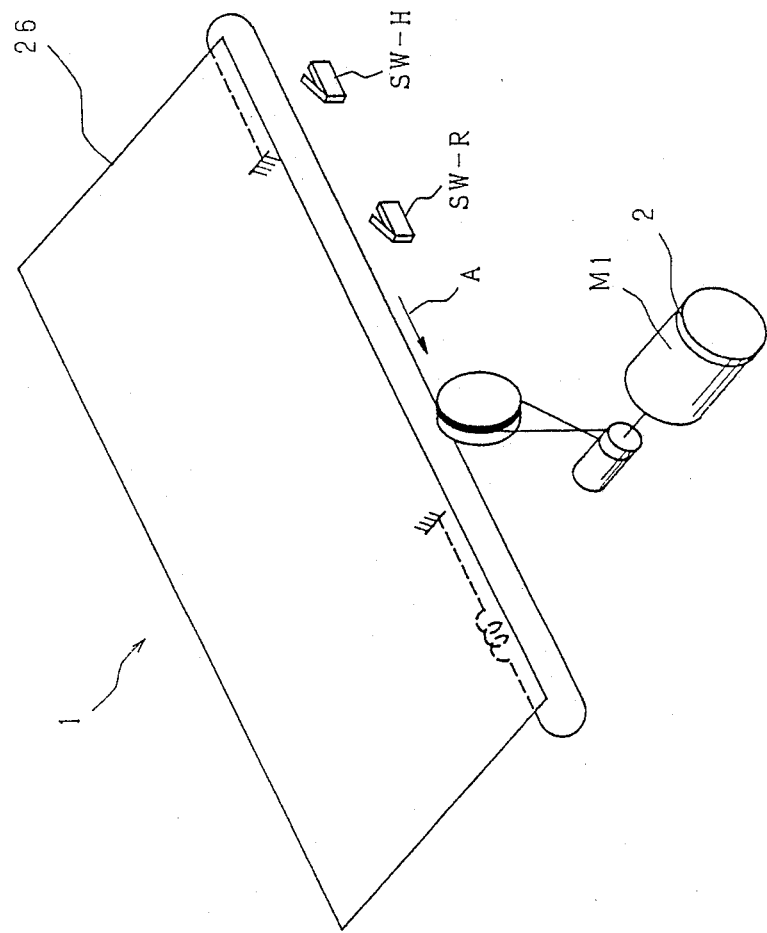
FIG. 2 is an explanatory view showing a moving mechanism of an original table.

In FIG. 2, numeral 1 denotes a scanning system including an original glass for carrying an original and M1 is a DC motor. The scanning system 1 can be driven by the DC motor M1 back and forth, or driven forward in the direction of the arrow A (hereinafter called scan) and driven backward in the reverse direction (hereinafter called return).

Numeral 2 indicates an encoder constituted mainly by a hall element and a magnet. The encoder 2 is installed on a rotary shaft of the DC motor M1 and produces pulse signals proportional to revolutions thereof. Moving distance of the scanning system 1 can be detected by the number of pulses and its speed can be detected by pulse intervals.

SW-H is a home switch for detecting whether the scanning system 1 is at the home position (scanning start position). When the scanning system 1 is at the home position, ON signal is produced and for the rest OFF signal is produced.

SW-R is a timing switch which detects the standard position for control to be described later with respect to the scanning system 1. When the scanning system 1 reaches a predetermined position, ON signal is produced and for the rest OFF signal is produced.

{Operating Panel}

Figure 3:
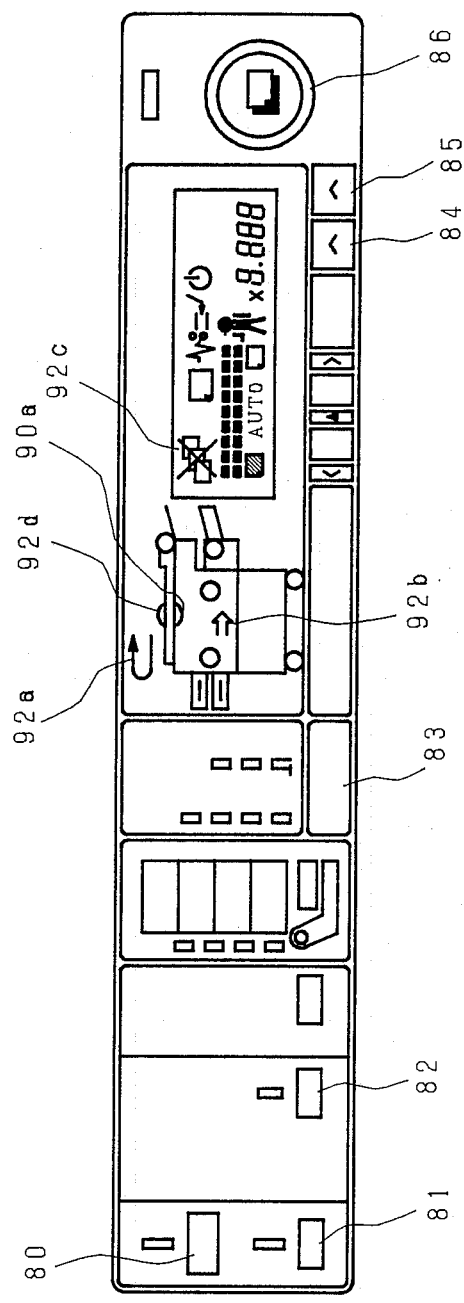
FIG. 3 is a plan view showing an operating panel 100 of the copying apparatus.

FIG. 3 is a plan view showing an operating panel 100 of the copying apparatus according to the present embodiment. The operating panel 100 is disposed in the upper front of the copying apparatus. As shown in FIG. 3, on the operating panel 100, a speed fluctuation detecting switch SW 80, load level detecting switch SW 81, multi-interrupt detecting switch SW 82, mode select switch SW 83 for selecting various modes sequentially, re-try displaying LED 92a, blank paper discharge displaying LED 92b, multi-interrupt displaying LED 92c, first load level displaying LED 92d, second load level displaying LED 90a, up-key 84, down-key 85, print switch 86 and so on are disposed from the left.

The re-try displaying LED 92a is for displaying that the scanning system 1 returns for re-trying copying operation due to the occurrence of speed fluctuations or the like.

The blank paper discharge displaying LED 92b is for displaying that the discharged copying paper is blank and not transferred since the image is disordered due to the speed fluctuations and so on.

The multi-interrupt displaying LED 92c is for displaying that future copying operation is stopped by determining that it is the presence of structural disorders that the speed fluctuations or the like can not be settled even after repeating copying operations for a predetermined number of times.

The first load level displaying LED 92d is for displaying that the load level of the scanning system 1 at this point of time is exceeding the first load level.

The second load level displaying LED 90a is for displaying that the load level of the scanning system 1 at this point of time is exceeding the second load level.

{Control Circuit of the Copying Apparatus}

Figure 4:
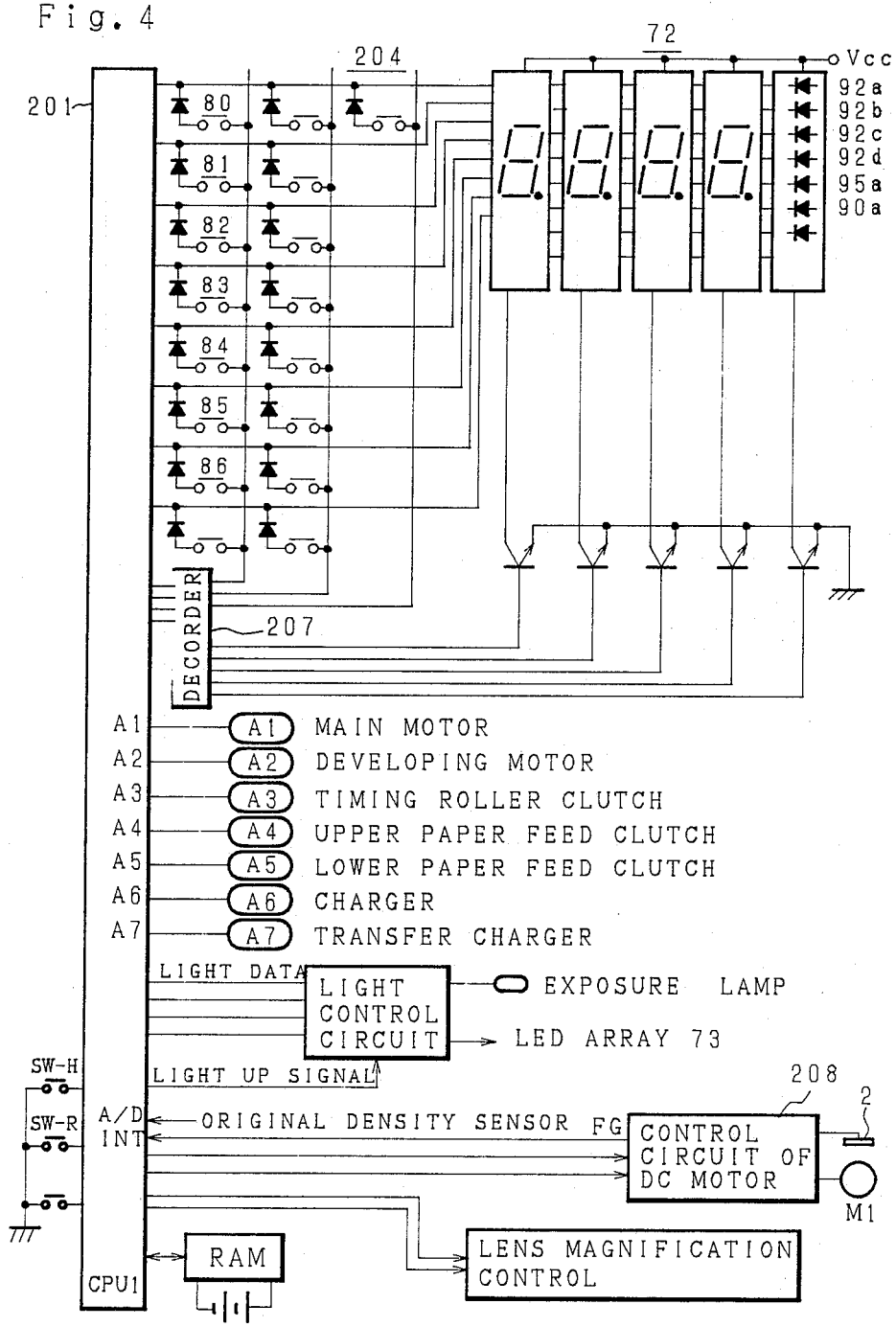
FIG. 4 is a view showing the configuration of a CPU 201 for controlling the copying apparatus.

FIG. 4 shows the configuration of a microcomputer (hereinafter referred to as a CPU) for controlling the copying apparatus.

Numeral 201 denotes the CPU which is the control center and comprises a read-write possible random access memory for storing data for control, read only memory for storing control programs and 8 bits and 16 bits internal counter input/output ports and so on.

To input ports of the CPU 201, switch matrix 204 constituted by key switches on the operating panel 100 and various sensors disposed in the copying apparatus, and a four digits numerical display 72 are connected via a decoder 207. The decoder 207 produces the signal which selects input or display portions responsive to the signal from the CPU 201. While, output ports of the CPU 201 are connected to the main motor, timing clutch, paper feed clutch, charger and transfer charger and output control signals thereto.

Numeral 208 indicates a control circuit of the DC motor M1 which converts the pulse signal of the encoder 2 into a square wave. Its rise (or fall) signal is inputted to an external interrupt terminal (INT) of the CPU 201 from the control circuit 208. The control circuit of the DC motor M1 controls the impressed voltage to the DC motor M1 by signal from the CPU 201. The control of impressed voltage is effected by ON and OFF (chopping) the constant voltage at a microtiming unit and the speed is controlled by adjusting its ON time. Moreover, the CPU 21 is connected to a timing switch SW-R and home switch SW-H and inputs these switch signals.

I Main Routine

Figure 5:
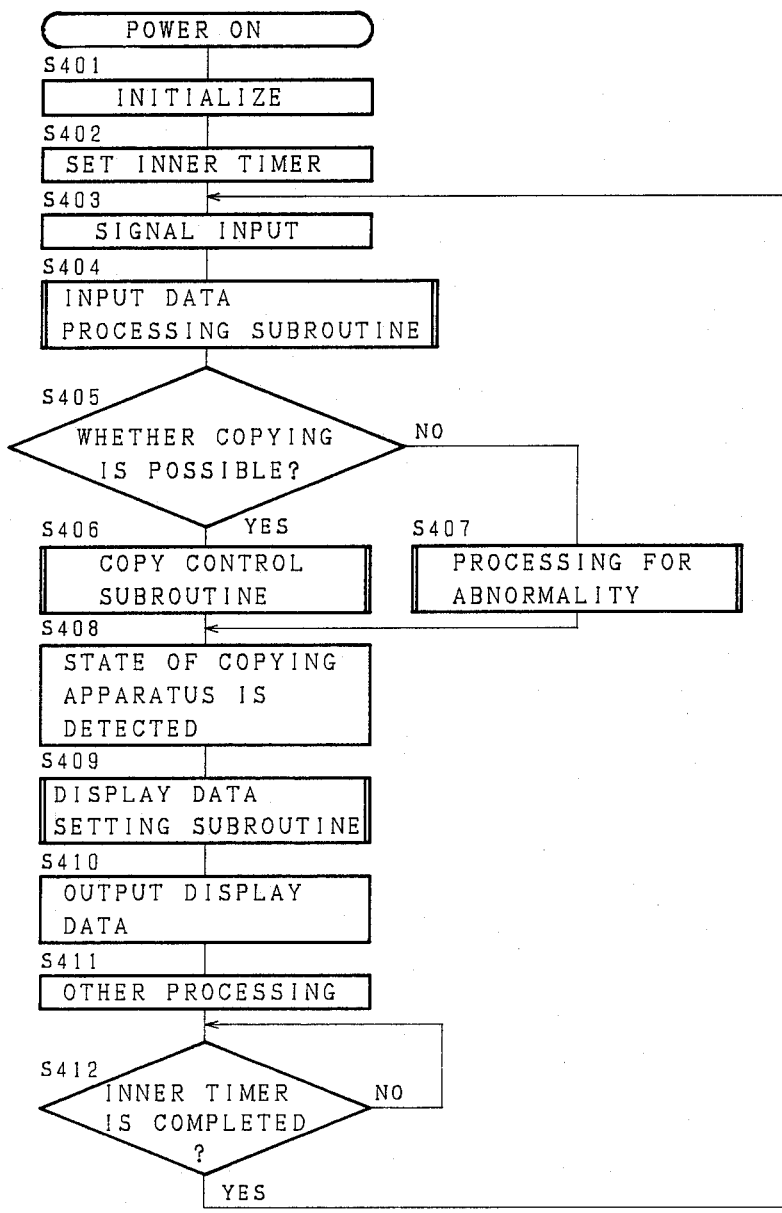
FIG. 5 is a flow chart showing a main routine of the CPU 201.

FIG. 5 is a flow chart showing a main routine of the CPU 201.

Before explaining the flow chart, terminologies ON-EDGE and OFF-EDGE used therein will be defined.

ON-EDGE is defined as the change of state wherein states of switches, sensors and signals change from OFF to ON.

OFF-EDGE is defined as the change of state wherein states of switches, sensors and signals change from ON to OFF.

When a power is applied to the copying apparatus 10, the CPU 201 and so on are initialized in Step S401.

In Step S402, an inner timer is set and a time of one routine for the following processings is set.

In Step S403, signals from the switches, sensors and so on arranged at various portions on the main body such as the operating panel 100 are inputted.

In Step S404, input data processing subroutines to be described later for processing inputted signals are executed.

Next, in Step S405, in response to the input data it is determined whether copying is possible, if it is impossible as in the case of jamming trouble and so on, it is determined "NO" and proceeds to Step S408 after processing for abnormality is executed in Step S407. When the print switch 86 is ON, it is determined "YES" and proceeds to Step S406 to execute the copying operation to be described later.

In Step S408, the state of copying apparatus (jamming trouble and so on) is detected and necessary data are set in Step S409. Setting procedures will be described later also.

Then, in Step S410, lighting of the displaying LED and so on is controlled on the operating panel, and in Step S411, other processings such as the temperature control of the fixing unit 38 are performed.

Finally, in Step S412, it is determined whether the inner timer set in Step S402 is completed, if "NO", it waits till completion and if "YES", it returns again to Step S403.

II Input Data Processing

Figure 6:
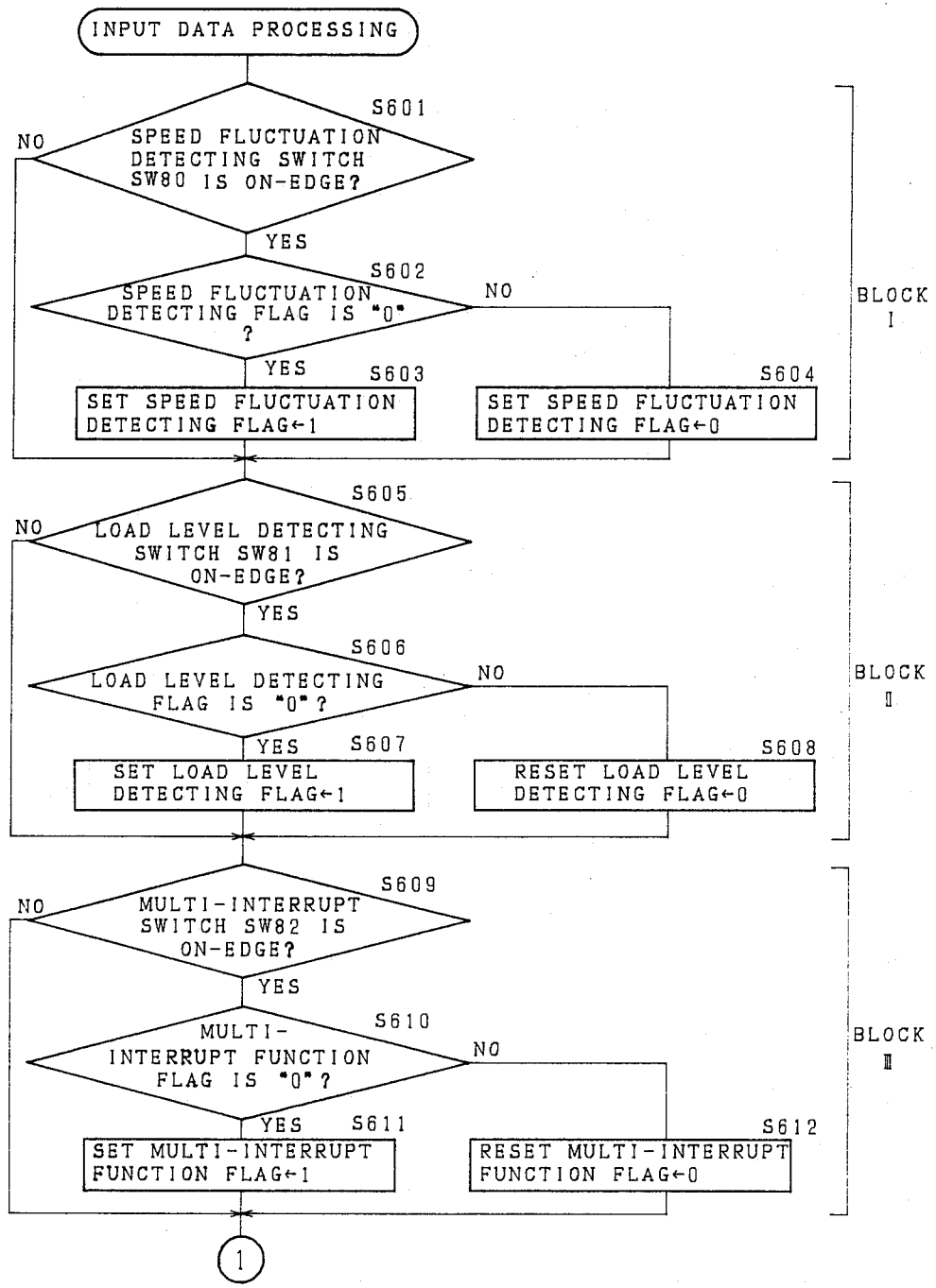
FIGS. 6, 7 are flow charts showing subroutines of input data processings.
Figure 7:
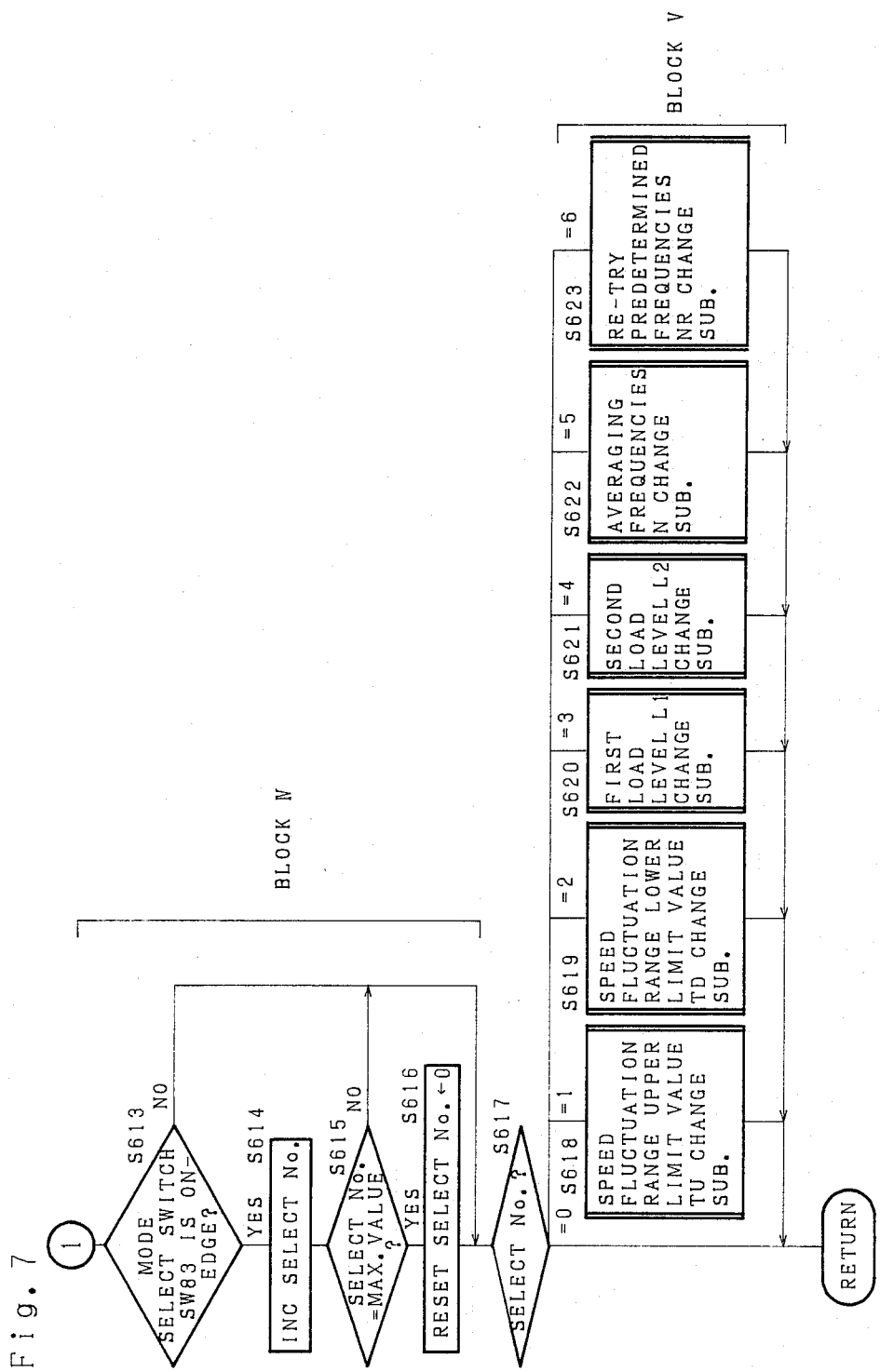

FIGS. 6, 7 show flow charts of programs executed in subroutines of the input data processing (Step S404). In the subroutines, in Block I, the content of speed fluctuation detecting flag is inverted when a speed fluctuation detecting switch SW 80 is pressed. In Block II, processing as same as that in Block I is executed when a load level detecting switch SW 81 is pressed. In Block III, processing as same as that in Block I is performed when a multi-interrupt switch SW 82 is pressed. In Block IV, select numbers are rotated in order from a small number whenever a select switch SW 83 is pressed. In Block V, in response to the select number, such processing as changing the detected level value is performed.

That is, in Step S601, it is determined whether the speed fluctuation detecting switch SW 80 is pressed. When the switch SW 80 is pressed and ON-EDGE is detected, it proceeds to Step S602 to invert the content of speed fluctuation detecting flag. If the speed fluctuation detecting flag is "0", the processing makes it "1" in Step S603, and if it is "1", the processing inverts it into "0" in Step S604. When ON-EDGE of the speed fluctuation detecting switch SW 80 is not detected in Step S601, since the content of flag is not changed, it skips Steps S602 through S604 and proceeds directly to the first Step of Block II.

In Step S605, it is determined whether the load level detecting switch SW 81 is pressed. When the switch SW 81 is pressed and ON-EDGE is detected, it proceeds to Step S606 and the content of load level detecting flag is inverted as same as in Block I (Step S606 through S608). When ON-EDGE of the switch SW 81 is not detected in Step S605, it skips directly to the first Step of Block III.

In Steps S609 through S612, the multi-interrupt function flag is inverted whenever ON-EDGE of the multi-interrupt switch SW 82 is detected.

Next, in Step S613, it is determined whether the mode select switch SW 83 is pressed. If the switch SW 83 is pressed and ON-EDGE is detected, it proceeds to Step S614 to increment the select number. Thereafter, in Step S615 it is determined whether the select number reaches a predetermined maximum value, when it has reached that value the select number is returned to "0" (Step S616). Thereby, the select number is rotated in order from a small number as "0"→"1"→"2"→ . . . →"6"→"0"→"1" whenever the select switch SW 83 is pressed (when the maximum value=7). Since it is not necessary to return to "0" when the select number has not reached a predetermined maximum value in Step S615, Step S616 is skipped. When it is determined in Step S613 that the select switch SW 83 is not pressed, since the select number is not needed to be changed, processings in Steps S614 through S616 are skipped and it proceeds directly to the first Step in Block V.

In Step S617, either of Steps S618 through S623 is selected responsive to the select number and the detected level value in each Step is changed.

When the select number is "0", it is determined as an ordinary mode and returns directly to the main routine without changing the entire detected level values. When the select number is other than "0", subroutines (Steps S618 through S623) which change the detected level value responsive to the select number are executed since it is a change mode.

The select number and detected level to be changed are as shown in the following Table 1.

TABLE 1

| Select numbers | Detected Level to be changed | Step-values when changed |
| --- | --- | --- |
| 0 | (Ordinary Copying State) | — |
| 1 | Speed Fluctuation Range Upper Limit Value TU | K1 |
| 2 | Speed fluctuation Range Lower Limit Value TD | K2 |
| 3 | First Load Level L1 | K3 |
| 4 | Second Load Level L2 | K4 |
| 5 | Averaging Frequencies N | K5 |
| 6 | Re-try predetermined Frequencies NR | K6 |

Where,

Speed Fluctuation Range Upper Limit Value (TU) . . . Upper limit value of the difference between motor pulse intervals responsive to the moving speed and target speed of the scanning system. (Problem is encountered when the moving speed is faster than the target speed.)

Speed Fluctuation Range Lower Limit Value (TD) . . . Lower limit value of the difference aforementioned. (Problem is encountered when the moving speed is slower than the target speed.)

First Load Level ... A load torque level corresponding to the light stress which does not influence the quality of image, but involves possibility of deteriorating the lifetime of the apparatus.

Second Load Level ... A load torque level corresponding to the heavy stress which causes trouble to the quality of image and considerably shortens the lifetime of the apparatus.

Averaging Frequencies ... When detecting the speed fluctuation and load level, their average values are taken to prevent the detecting accuracy from becoming over sensitive. Sampling frequencies for taking the average values.

Re-try frequencies ... Maximum re-try frequencies for interrupting and starting again the copying operation when the averaged speed fluctuation exceeds the upper limit (TU) or lower limit (TD) values, or when the load level exceeds the second load level.

Step-values of Each Detected Level ... For adjusting the detecting sensitivity and accuracy in response to the user's choice or conditions of the apparatus when making the detecting accuracy sensitive or insensitive.

Figure 14:
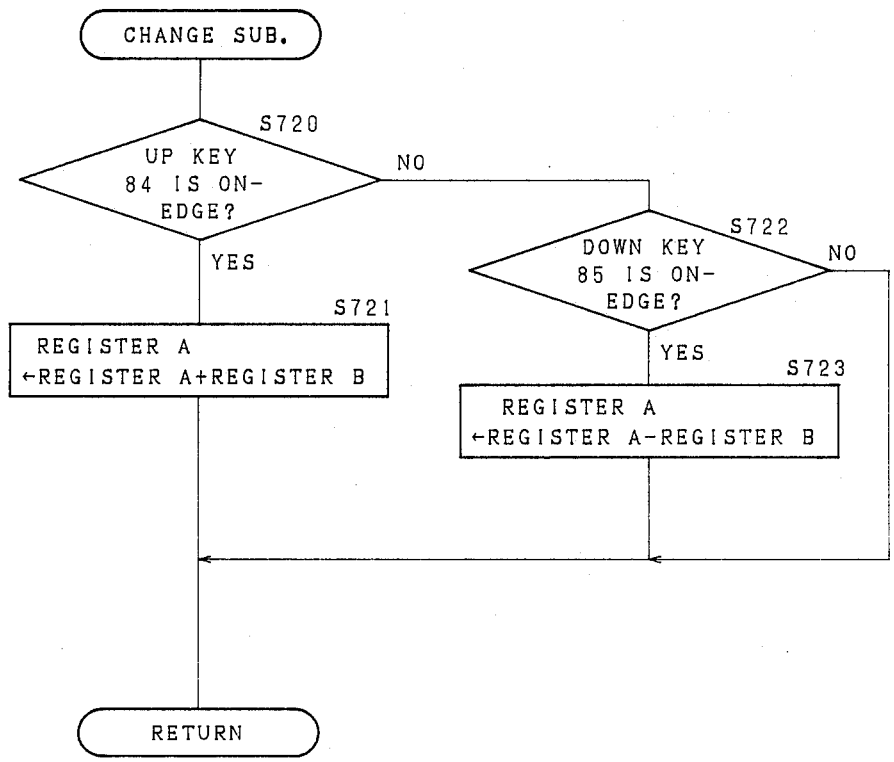
FIG. 14 is a flow chart showing a subroutine for changing a detected level value.

FIGS. 8 through 13 are flow charts of programs executed in subroutines for changing the detected level values (Steps S618 through S623), and FIG. 14 is a flow chart of a program executed in the change subroutine.

Figures 8, 9:
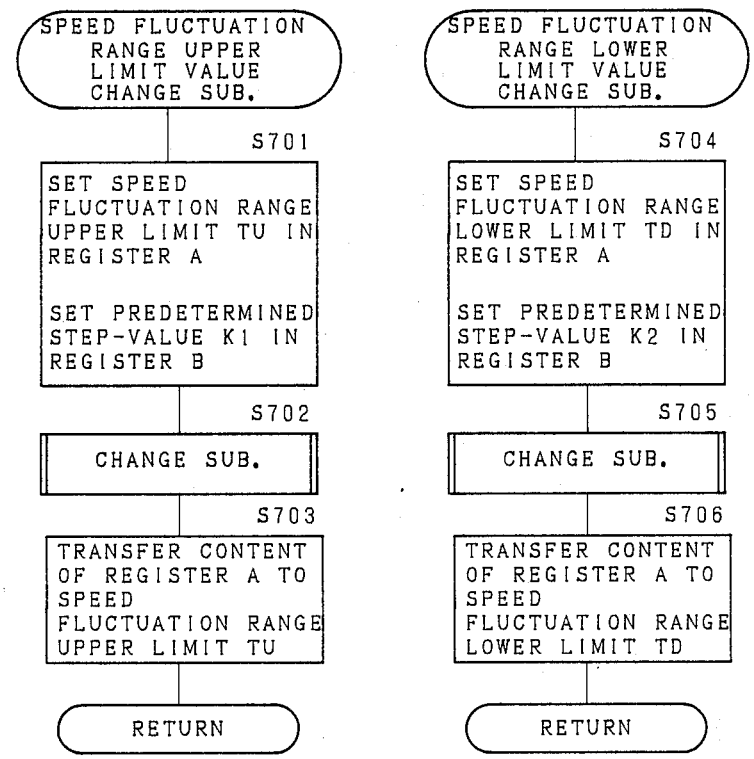
FIGS. 8 through 13 are flow charts showing subroutines for changing detected level values.
Figures 10, 11:
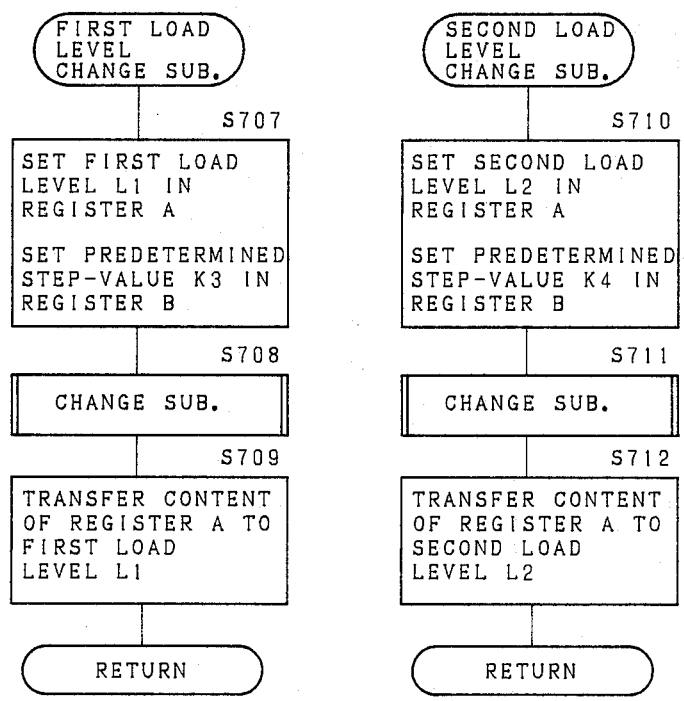
Figure 12:
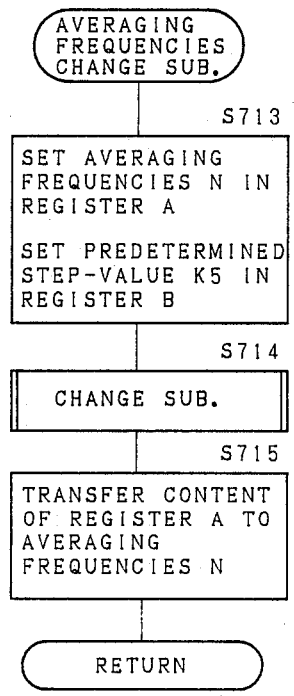
Figure 13:
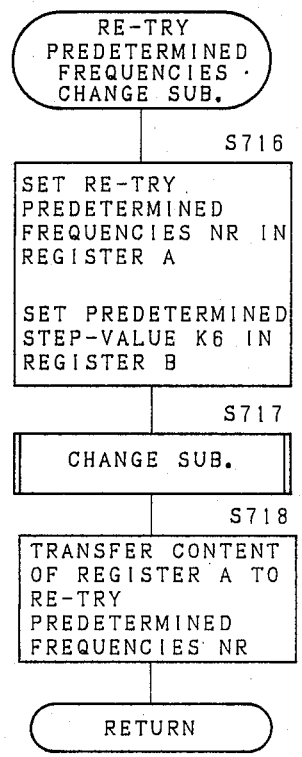

In FIG. 8, in Step S701, the present speed fluctuation range upper limit value TU is set in a register A, and a predetermined step-value K1 is set in a register B. In next Step S702, the change subroutine as shown in FIG. 14 is executed and the value of register A changes whenever the up-key 84 or down-key 85 is pressed.

That is, it is determined in Step S720 whether the up-key 84 is pressed. When the up-key 84 is pressed and ON-EDGE is detected, it proceeds to Step S721 and processing to add the value of register B (Step-width) to the value of register A is performed. When the up-key 84 is not pressed, it proceeds to Step S722 to check the state of down-key 85.

When the down-key 85 is pressed and ON-EDGE is detected in Step S722, it proceeds to Step S723 and processing to subtract the value of register B (Step-width) from the value of register A is performed.

When it is determined in Step S722 that the down-key is not pressed, since both the up-key 84 and down-key 85 are not pressed, Step S723 is skipped in order not to change the value of register A.

As aforementioned, since the content of register A is transferred to the speed fluctuation range upper limit value TU in Step S703, after the value of register A is changed responsive to the states of up-key 84 and down-key 85 in the change subroutine (Step S702), the speed fluctuation range upper limit value TU is also changed.

Also in FIGS. 9 through 13, processings to change the detected level value are performed as same as the processings performed in FIG. 8. Thereby, the detected level value can be changed responsive to the select number whenever the up-key 84 and down-key 85 are operated.

When such processings are completed, the program returns to the main routine.

III Copying Control Subroutines

FIGS. 15 through 24 show copying control subroutines (Step S406) in detail.

First, in Step S800, the content of copying state is checked and processing to jump to the subroutine of one of Steps S810 through S890 responsive to the copying state value is performed.

{Copying State "0"}

Figure 16:
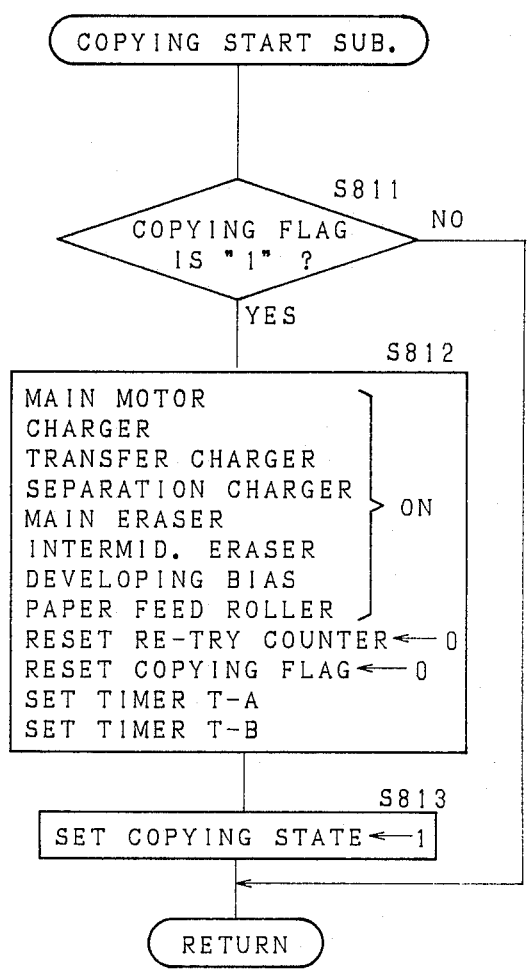

When the content of copying state is "0", it proceeds to Step S810 to process to start copying. In Step S810, the processing of flow chart shown in FIG. 16 is performed.

First, a copying flag showing whether or not to start copying is checked in Step S811. If the copying flag is "1", it proceeds to Step S812. In Step S812, the main motor M is driven, the photosensitive drum 11 is rotated and each roller such as paper feed roller is in rotatable state. Likewise, the charger 13, transfer and separation chargers 17, 18 are ON and the photosensitive drum 11 is started to charge. Furthermore, the main eraser 12 and intermediate eraser 41 are also ON to erase charges on the unnecessary image areas on the photosensitive drum 11 so as to save a developer.

Then, after resetting a copying flag and re-try counter at "0", a timer T-A for controlling the rotating time of the paper feed roller provided in the paper feed cassette selected, and a timer T-B for controlling the light-up timing of the exposure lamp 27 are set. Thereafter, in Step S813, the copying state is set at "1" and it returns to the main routine. While, when it is determined in Step S811 that the copying flag is "0", since it is not necessary to start copying operation, Steps S812 through S813 are skipped and it returns to the main routine.

{Copying State "1"}

Figure 17:
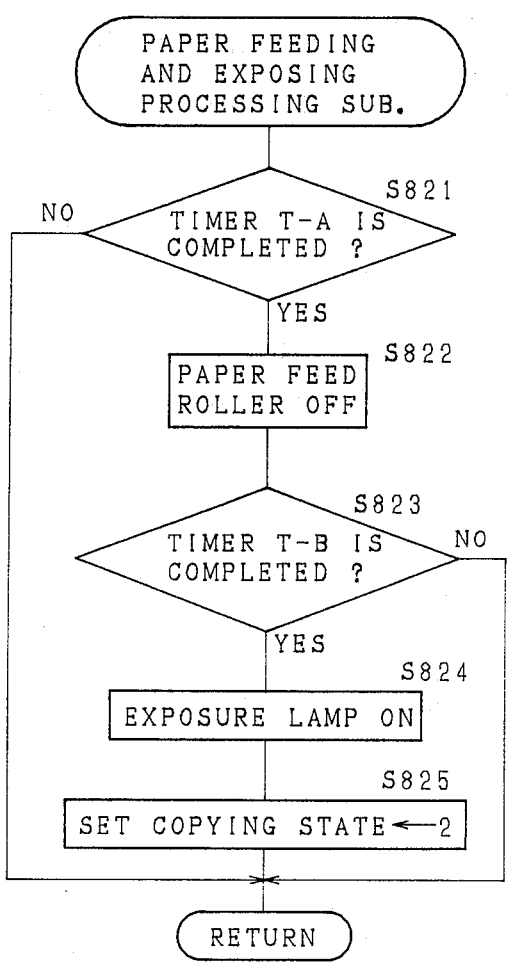

When the content of copying state is "1", it proceeds to Step S820 and paper feeding and exposing processings are performed. In Step S820, the program shown in FIG. 17 is executed.

First, in Step S821, it is determined whether a time set by the paper feed roller control timer T-A has elapsed. If not, the following processings are skipped and it returns to the main routine. When it is determined that the time set by the paper feed roller control timer T-A has elapsed, the paper feed rollers 31, 33 operated till they are OFF in Step S822, and copying paper is stopped before the pair of timing rollers 36. Then, it proceeds to Step S823 to determine whether the timer T-B for starting the exposure is completed. When it is determined NO, the following Steps S824, S825 are skipped and it returns to the main routine. When it is determined YES, it proceeds to Step S824 to light the exposure lamp 27. Then, after setting the copying state at "2" in Step S825, it returns to the main routine.

{Copying State "2"}

Figure 18:
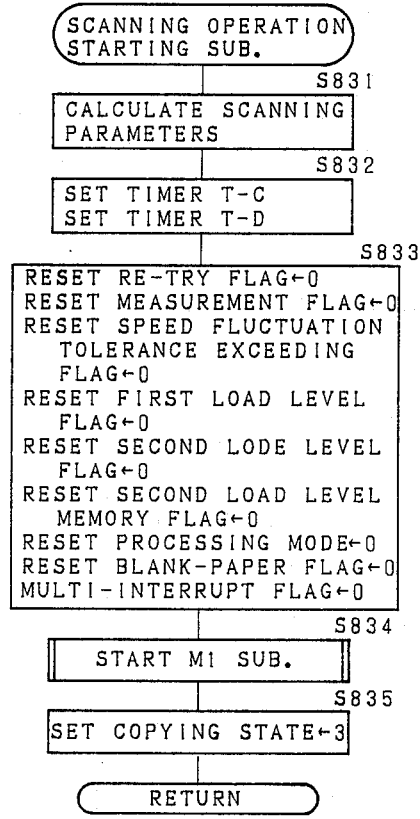

When the content of the copying state is "2", it proceeds to Step S830 to perform processing for starting the scanning operation of the scanning system 1. In Step S830, the processing of the flow chart as shown in FIG. 18 is executed.

First, in Step S831, parameters necessary for scanning such as encoder pulse intervals TSI responsive to the target scanning speed, coefficient K used for calculating the energizing time in the constant speed control (interrupt processing routine) to be described later, and the energizing time $P_0$ are calculated responsive to the target velocity (or copying magnification). Then, in Step S832, a timer T-C for controlling timing to start measurement of data necessary for various detecting functions (encoder pulse intervals and energizing time to the motor), and a timer T-D showing the timing of the tip of image recorded on the photosensitive drum 11 to reach the position of intermediate eraser 41 are set. Thereafter, in Step S833, various flags and modes necessary for detection are initialized. Then, after executing the subroutine to be described later in FIGS. 25, 26 for starting the DC motor M1 to start driving of the scanning system 1 in Step S834 and updating the copying state at "3" in Step S835 and it returns to the main routine.

Figure 25:
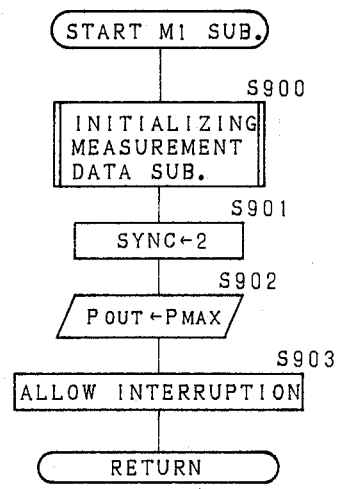
FIGS. 25, 26 are flow charts showing Steps S834, S876 in detail.
Figure 26:
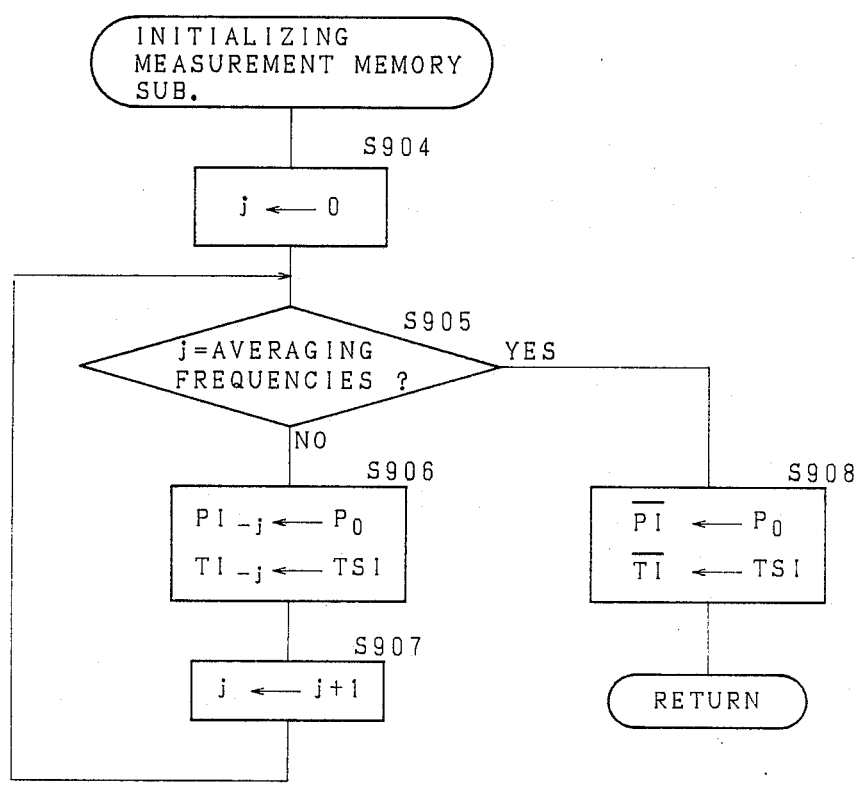

FIGS. 25, 26 are flow charts of subroutines for starting the DC motor M1 in Step S834.

First, in Step S900, measurement data necessary for detecting the speed fluctuation and load level as shown in FIG. 26 are initialized. That is, a counter j showing the number of data is set at "0" in Step S904, and it is determined in Step S905 whether the counter j corresponds to the averaged frequency N. If not, it proceeds to Step S906 and sets the average energizing time $P_0$ in a register PI-j (j corresponds to the counter j value) storing measurement data of the energizing time to the motor for detecting the load level. The time intervals TSI of encoder pulses responsive to the target scanning speed is set in a register TI-j (j corresponds to the counter j value) storing measurement data of the time intervals of the encoder pulses. Then, after incrementing the counter j in Step S907, it returns to Step S905.

When it is determined in Step S905 that the counter j showing the number of data corresponds to the averaged frequency N, it proceeds to Step S908 and initializes the average value register. That is, the time intervals TSI of pulses responsive to the target scanning speed is set in the register storing the average value $\overline{TI}$ of encoder pulse intervals, and the average energizing time $P_0$ is set in the register storing the average motor energizing time $\overline{PI}$. Thereby, the detecting measurement data and average value of the speed fluctuation and load level where the counter j corresponds to "0" through "N", are initialized.

Next, in Step S901, in order to synchronize the encoder pulse of the DC motor M1 and interrupt processing, the number of encoder pulses till starting control of the energizing time to the motor is set in a register SYNC. In Step S902, since the DC motor M1 is initially at a standstill, the energizing time $P_{MAX}$ for start-up is outputted to the motor to perform processing to allow interruption in Step S903. Thereby, following speed controls of the DC motor M1 are effected by the interrupt processing routine to be described later at every occurrence of encoder pulses.

{Copying State "3"}

Figure 15:
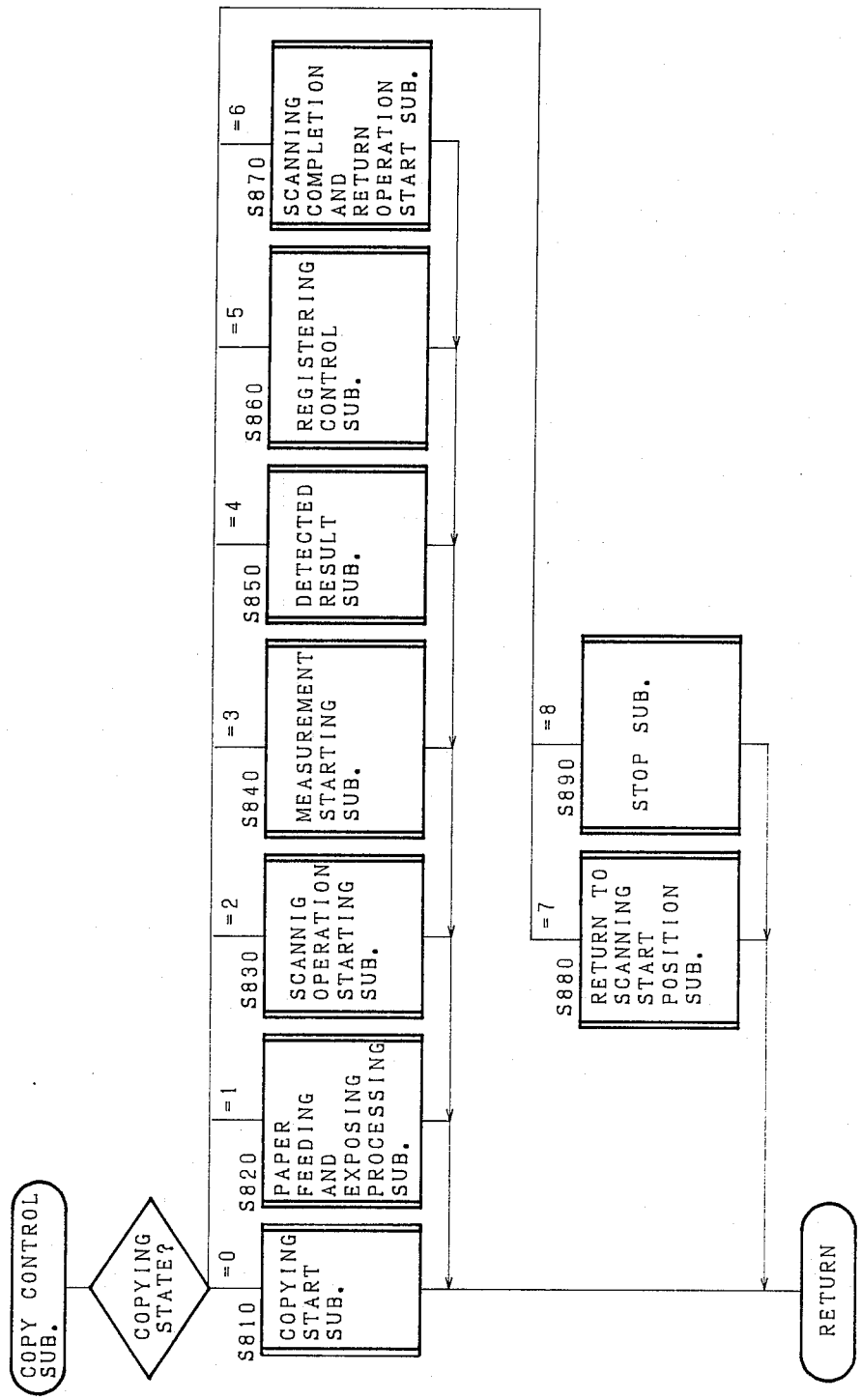
FIGS. 15 through 24 are flow charts showing subroutines of the copy control.
Figure 19:
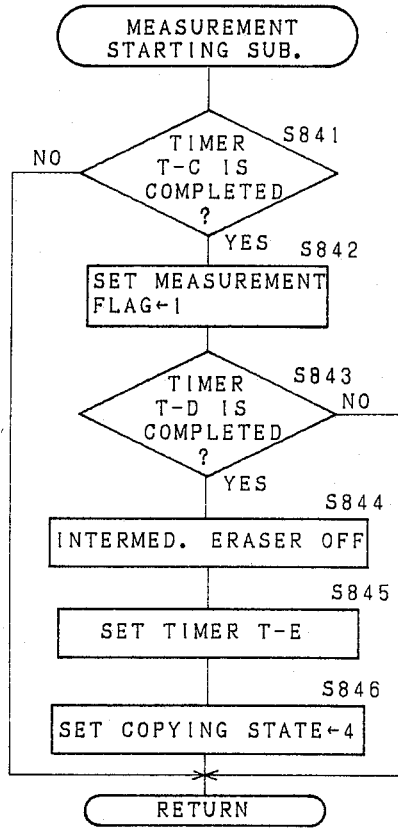

When the content of copying state is "3" in FIG. 15, it proceeds to Step S840 to perform processing to start measurement of detecting data. In Step S840, processing of the flow chart as shown in FIG. 19 is executed.

First, in Step S841, it is determined whether a timer T-C for controlling timing to start measurement of data necessary for various detecting functions is completed. When it is determined that it is not completed the following processings are skipped and it returns to the main routine. When the timer T-C is completed, in Step S842, a measurement flag is set at "1" to start measurement of data necessary for various detecting functions. Thereby, in the interrupt processing routine to be described later, measurement data are sampled (refer to Step S1007).

Next, it proceeds to Step S843 to determine whether a timer T-D is completed. If the timer T-D is not completed, processings of Steps S844 through S846 are skipped and it returns to the main routine. When the timer T-D is completed, it is determined that the tip of the effective image area recorded on the photosensitive drum 11 has reached the position of intermediate eraser 41, which is OFF in Step S844. Then, after setting a timer T-E showing timing to determine the detected result in Step S845 and updating the copying state to "4" in Step S846, it returns to the main routine.

{Copying State "4"}

Figure 20:
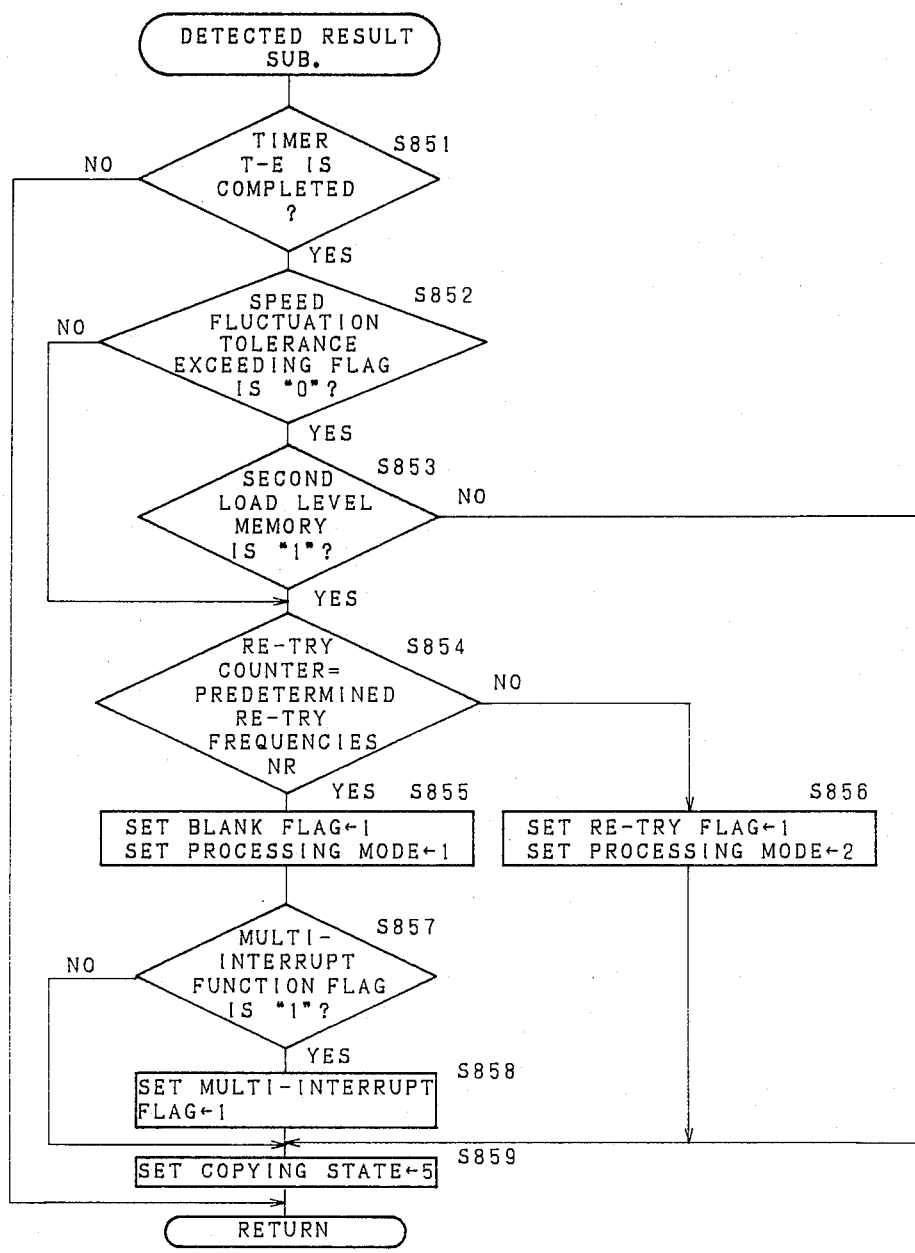

When the content of copying state is "4" in FIG. 15, it proceeds to Step S850 to determine and process the detected result. In Step S850, processings of the flow chart as shown in FIG. 20 are executed.

First, in Step S851, it is determined whether the timer T-E shows whether or not the timing for determining the detected result is completed. When the timer T-E is not completed, it is determined that it is not the time for determining the detected result and the following processings are skipped and it returns to the main routine. When the timer T-E is completed, it proceeds to Step S852 to check a speed fluctuation tolerance exceeding flag showing whether or not the moving speed fluctuation of the scanning system 1 exceeds the tolerance during the period from the start of measurement till this point.

When it is determined in Step S852 that the speed fluctuation tolerance exceeding flag is "1", it proceeds to Step S854 to perform processing for abnormality of the scanning system 1. When it is determined that the speed fluctuation tolerance exceeding flag (refer to Step S1011) is "0", it proceeds to Step S853 to check the load level of the scanning system 1.

That is, a second load level memory flag (refer to Step S1016) is determined in Step S853 and if it is "0", processings for abnormality in Steps S854 through S858 are skipped to perform the following processings as the normal copying.

When it is determined in Step S852 that the speed fluctuation exceeds the tolerance and in Step S853 that there is a qualitative problem of image in the load level of the scanning system 1, it is determined in Steps S854 through S856 to be described below that the image recorded on the photosensitive drum 11 is deformed and the copying operation is repeated once again. However, when the speed fluctuation cannot be kept within the tolerance or the load level is excessive still after a predetermined frequency of repititions, such processing as to discharge a blank paper is performed.

That is, it is determined in Step S854 whether a re-try counter which shows the repetitions of copying operation corresponds to predetermined re-try frequencies NR. If not, the copying operation is repeated. For this purpose, it proceeds to Step S856 to set the re-try flag at "1" and to set the processing mode at "2", then proceeds to Step S859. If yes, it is determined that the state of scanning system 1 which may influence the image is not solved even after repeating the predetermined frequencies of copying operation, and the copying paper fed in the copying apparatus 10 is discharged as it is in blank. For this purpose, a blank paper flag and the processing mode are set respectively at "1" in Step S855.

Now, when the abnormal state of scanning system 1 cannot be solved even after repeating the copying operation for a predetermined number of times, there is a possibility that the same phenomenon will occur in the following copying operation by multi-copying. Therefore, it is processed to interrupt multi-copying. In Step S857, when the copying apparatus 10 falls into such a state, a multi-interrupt function flag showing whether or not to operate the multi-copying interrupt function thereafter is checked. When the multi-interrupt function flag is "1", the processing makes multi-interrupt flag "1" in Step S858 to interrupt the multi-copying. While, when the multi-interrupt function flag is "0", Step S858 is skipped. Finally, the copying state is updated to "5" in Step S859 and it returns to the main routine.

{Copying State "5"}

Figure 21:
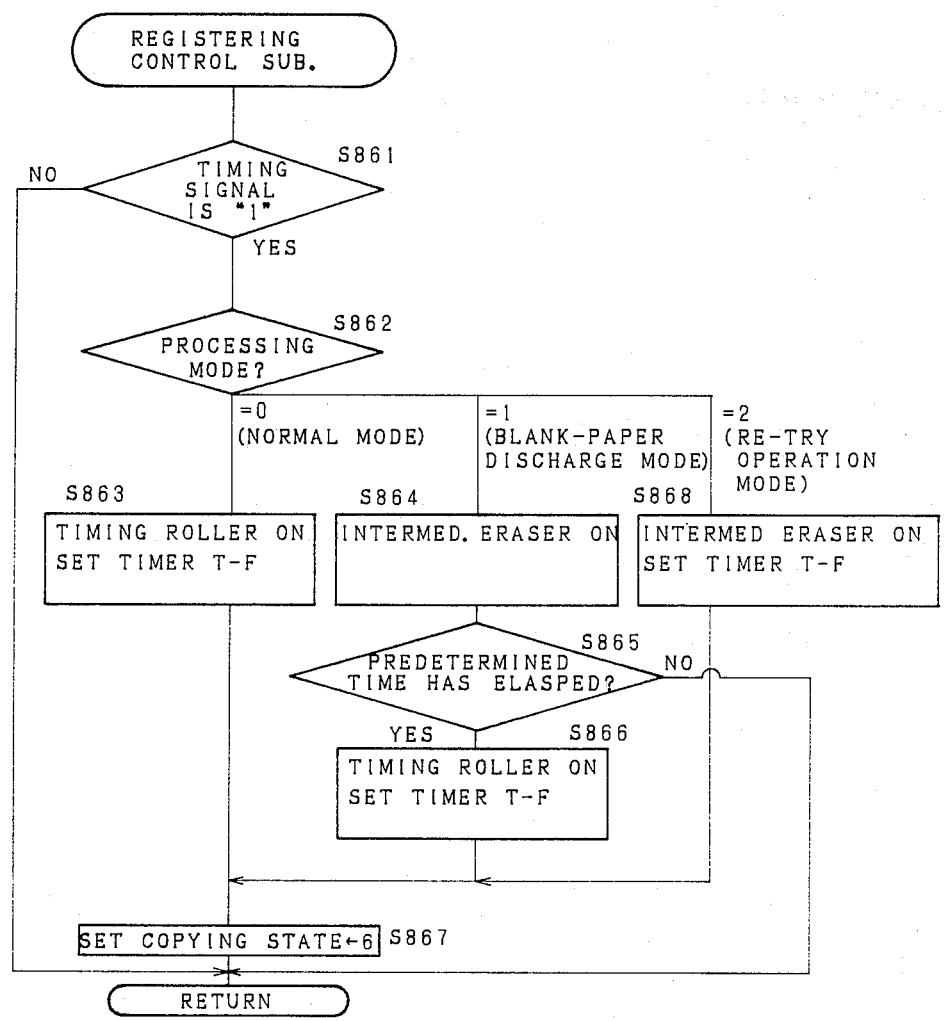

When the content of copying state is "5" in FIG. 15, it proceeds to Step S860 for registering control. In Step S860, processing of the flow chart as shown in FIG. 21 is executed.

First, in Step S861, it is determined whether the timing signal is "1", or the scanning system 1 has moved to the timing switch SW(SW-R) to press it. When it is determined that the timing signal is not "1", processings in Steps S862 through S867 are skipped and it returns to the main routine. When the timing signal is "1", it proceeds to Step S862 to select the processing content responsive to the processing mode.

When the processing mode is "0", since it is a normal mode it proceeds to Step S863 to ON the pair of timing rollers 36 immediately which feeds the copying paper toward the photosensitive drum 11. Simultaneously, a timer T-F for controlling the driving time of the pair of timing rollers 36 is set. Then, it proceeds to Step S867 to update the copying state to "6".

When the processing mode is "1", since it is a blank paper discharge mode, it proceeds to Step S864 to ON the intermediate eraser 41 and to erase the electric charge on the photosensitive drum 11 thereafter entirely. Reasons for switching ON the intermediate eraser 41 here is to save a developer which is wasted by developing an electrostatic latent image already formed on the photosensitive drum 11 by the developing unit 16 with a toner, and to shorten the time required for discharging the blank paper.

Figure 33:
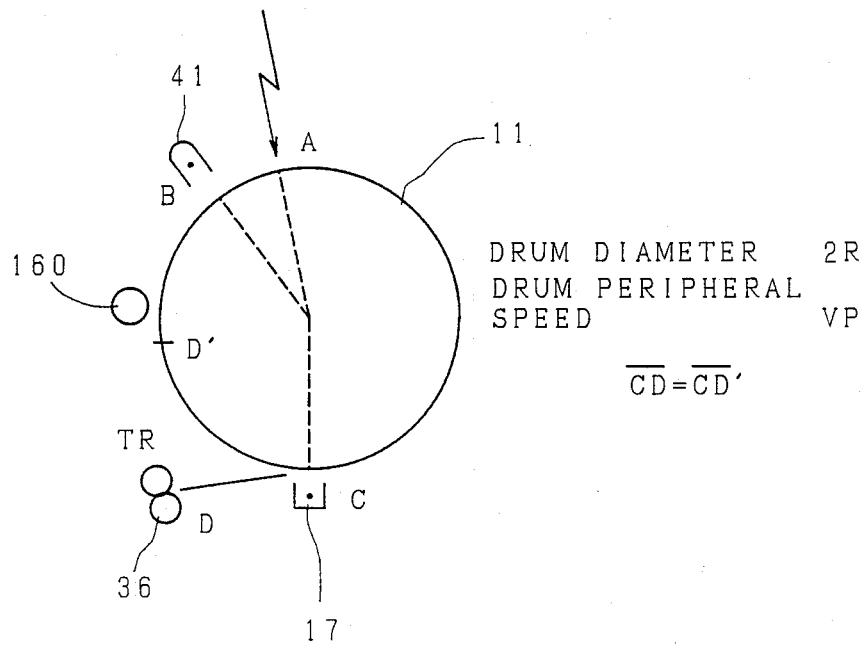
FIG. 33 is an explanatory view for explaining a predetermined time of Step S865.

Next, in Step S865, it is determined whether the time required for the effective image area on the photosensitive drum 11, which has already passed the position where the electric charge can be erased by the intermediate eraser 41, to pass the transferring position has elapsed. That is, as shown in FIG. 33, the area head recorded on the photosensitive drum 11 hitherto as the effective image area has already reached point D' at the time when the blank paper discharge is decided. Therefore, the image recorded between points B and D' where the electric charge can be erased by the intermediate eraser 41 is developed. Thus, the copying paper must be fed from the pair of timing rollers 36 after the photosensitive drum 11 is rotated, at least, by a distance corresponding to the points B to D' from the time point when the timing signal responsive to the effective image area head has become "1", otherwise the toner image is transferred and the paper cannot be discharged in blank. Accordingly, when it is detected in Step S865 that the predetermined time has elapsed, it proceeds to Step S866 to ON the pair of timing rollers 36. The timer T-F for controlling the driving time of pair of timing rollers 36 is set simultaneously and it proceeds to Step S867. When the predetermined time has not elapsed, Step S866 and so on are skipped and it returns to the main routine.

When the processing mode is "2", since it is the re-try operation mode, it proceeds to Step S868 to ON the intermediate eraser 41 and the electric charge on the photosensitive drum 11 thereafter is erased to save the developer from being wasted. Then, a timer showing the return start timing is set as T-F and it proceeds to Step S867. That is, the pair of timing rollers 36 is not ON and the copying paper is standing by before the pair of timing rollers 36 in the copying apparatus 10.

{Copying State "6"}

Figure 22:
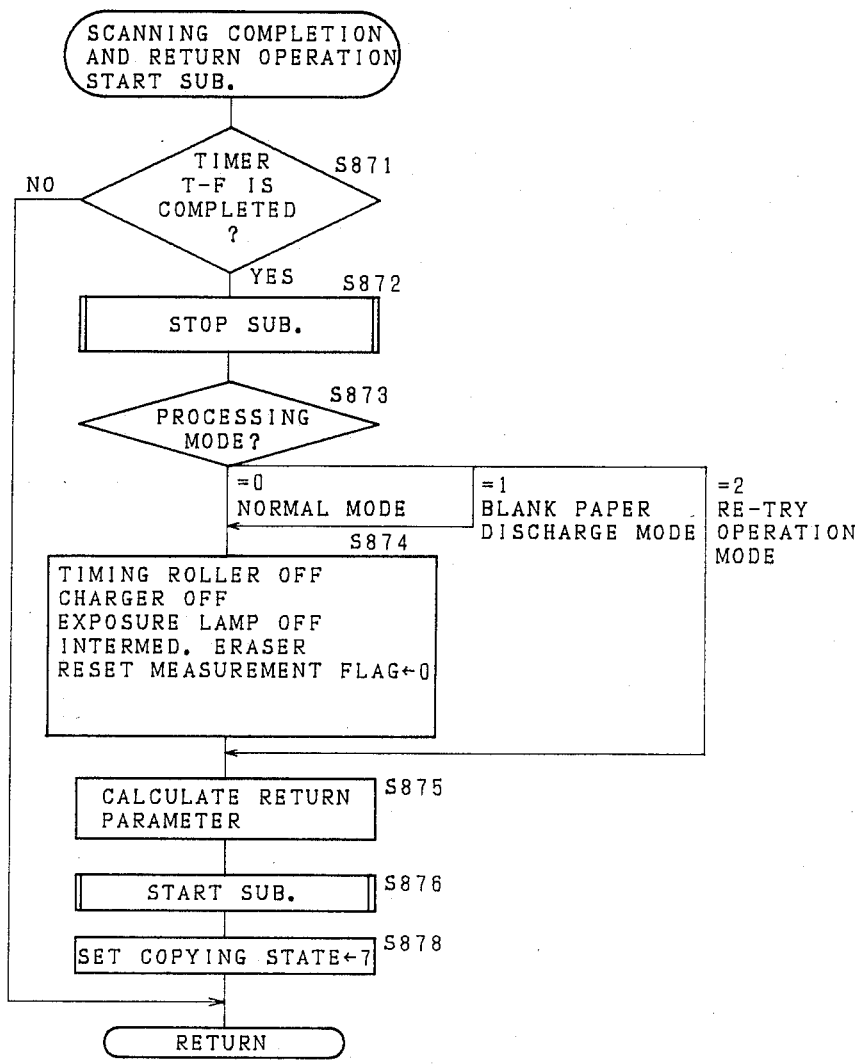

When the content of copying state is "6" in FIG. 15, it proceeds to Step S870 to execute processings for the scanning completion and return operation start. In Step S870, processings of the flow chart as shown in FIG. 22 are executed.

Figure 27:
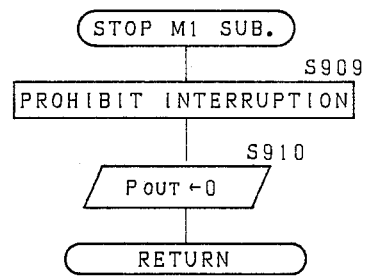
FIG. 27 is a flow chart showing Steps S872, S882 in detail.

First, it is determined in Step S871 whether the timer T-F is completed, if it is not completed, the following processings are skipped and it returns to the main routine. When it is determined that the timer T-F is completed, the driving of DC motor M1 is stopped in Step S872 to complete the scanning operation. FIG. 27 is a flow chart of subroutine for stopping the DC motor M1 in Step S872. After prohibiting interruption and execution of the interrupt processing routine in Step S909, energizing to the DC motor M1 is stopped in Step S910.

Then, in Step S873, responsive to the processing mode, processings to peripheral devices of the photosensitive drum 11 and so on are selected.

When the processing mode is "0", since it is a normal copying mode, it proceeds to Step S874 to complete the interrupt control of the image. That is, the pair of timing rollers 36 is OFF to finish feeding the copying paper. Then, the chargers 13, 15 are OFF and the exposure lamp 27 is also switched OFF. Furthermore, the intermediate eraser 41 is ON to erase the electric charge on the photosensitive drum 11. Since the scanning operation of scanning system 1 is also completed, and data which were necessary for various detections such as the speed fluctuation and so on are not required to be measured, a measurement flag is reset at "0". Thereafter, it proceeds to Step S875.

When the processing mode is "1", though it is a blank paper discharge mode, since it coincides with the point of discharging the copying paper, Step S874 as same as the processing mode "0" is executed.

When the processing mode is "2", since it is a re-try operation mode, the copying operation is repeated, so that the state of peripheral devices of the photosensitive drum 11 is maintained as it is. Thus, Step S874 is skipped and it proceeds to Step S875 to move to return operation. In Step S875, various parameters necessary for the return operation are calculated to start the DC motor M1 and return the scanning system 1 in Step S876, then the copying state is updated to "7" in Step S877 and it returns to the main routine.

{Copying State "7"}

Figure 23:
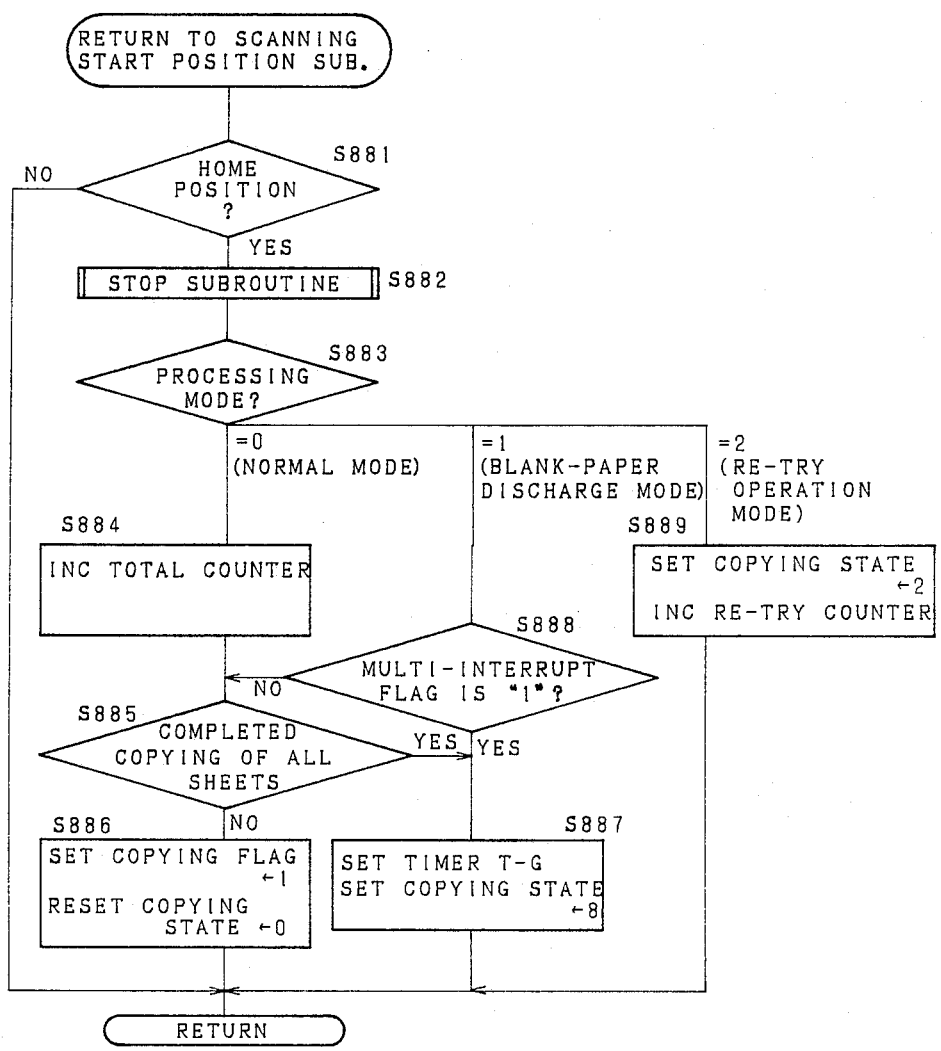

When the content of copying state is "7" in FIG. 15, it proceeds to Step S880 to execute processing which is to be performed when the scanning system 1 has returned to the scanning start position. In the Step S880, processing of the flow chart as shown in FIG. 23 are executed.

First, it is determined in Step S881 whether the scanning system 1 has returned to the home position. When it is determined NO, following processing are skipped and it returns to the main routine. When it is determined in Step S881 that the scanning system 1 has returned to the home position, it proceeds to Step S882 to execute a stop routine shown in FIG. 27. That is, the driving of DC motor M1 is stopped and return operation of the scanning system 1 is completed.

Next, in Step S883, responsive to the processing mode, the content of processing is selected.

When the processing mode is "0", since it is a normal copying mode, it proceeds to Step S885 after incrementing the total counter in Step S884. In Steps S885 through S887, if sheets to be copied are left, the copying operation aforementioned is restarted, and after completing copying of all sheets to be copied, the apparatus is stopped. That is, it is determined in Step S885 whether copying of all sheets to be copied is completed. If it is not completed, it proceeds to Step S886 to set the copying flag at "1" and returns the copying state to "0" to start copying again. While, when the copying is completed, it proceeds to Step S887 to set a timer T-G for stopping the main motor and updates the copying state to "8".

When the processing mode is "1", since it is a blank paper discharge mode, the total counter is not incremented as in Step S884 and it proceeds to Step S888. This is because that since the value of total counter is responsive to charges paid by the user, it is improper if charges are added irrespective of the blank paper discharge. In Step S888, the multi-interrupt flag which shows whether or not to interrupt multi-copying is checked. When the multi-interrupt flag is determined as "1", regardless of remained sheets to be copied, it proceeds to Step S887 and enters the stop operation to interrupt the multi-copying. When it is determined in Step S888 that the multi-interrupt flag is "0", it proceeds to Step S885 to execute controls responsive to the remained sheets to be copied.

When the processing mode is "2", since it is a re-try operation mode, the copying state is updated to "2" in Step S889 to bring the scanning system 1 to enter the copying operation once again. This is because the scanning can be started at once since peripheral devices of the photosensitive drum 11 are in a state to continue copying. The re-try counter is also incremented.

}Copying State "8"}

Figure 24:
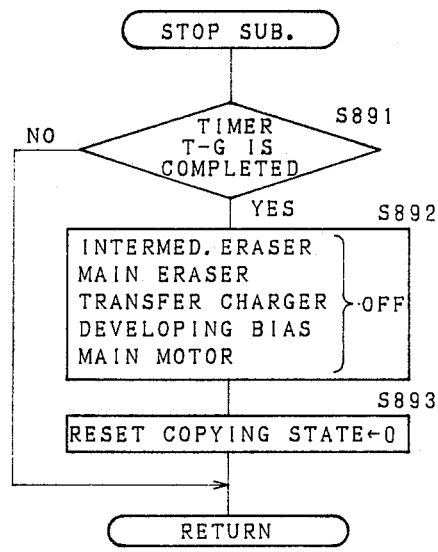

When the content of copying state is "8", it proceeds to Step S890 to process for stopping the main motor and so on. In Step S890, processings of the flow chart as shown in FIG. 24 are executed.

First, in Step S891, it is determined whether the timer T-G for stopping the main motor is completed, if not, following processings are skipped and it returns to the main routine. When it is determined in Step S891 that the timer T-G is completed, it proceeds to Step S892 to stop the driving of main motor M after switching OFF the peripheral devices of the photosensitive drum 11 such as the intermediate eraser 41. In Step S893, the copying state is returned to "0" and initialized.

IV Interrupt Processing Routine

Figure 28:
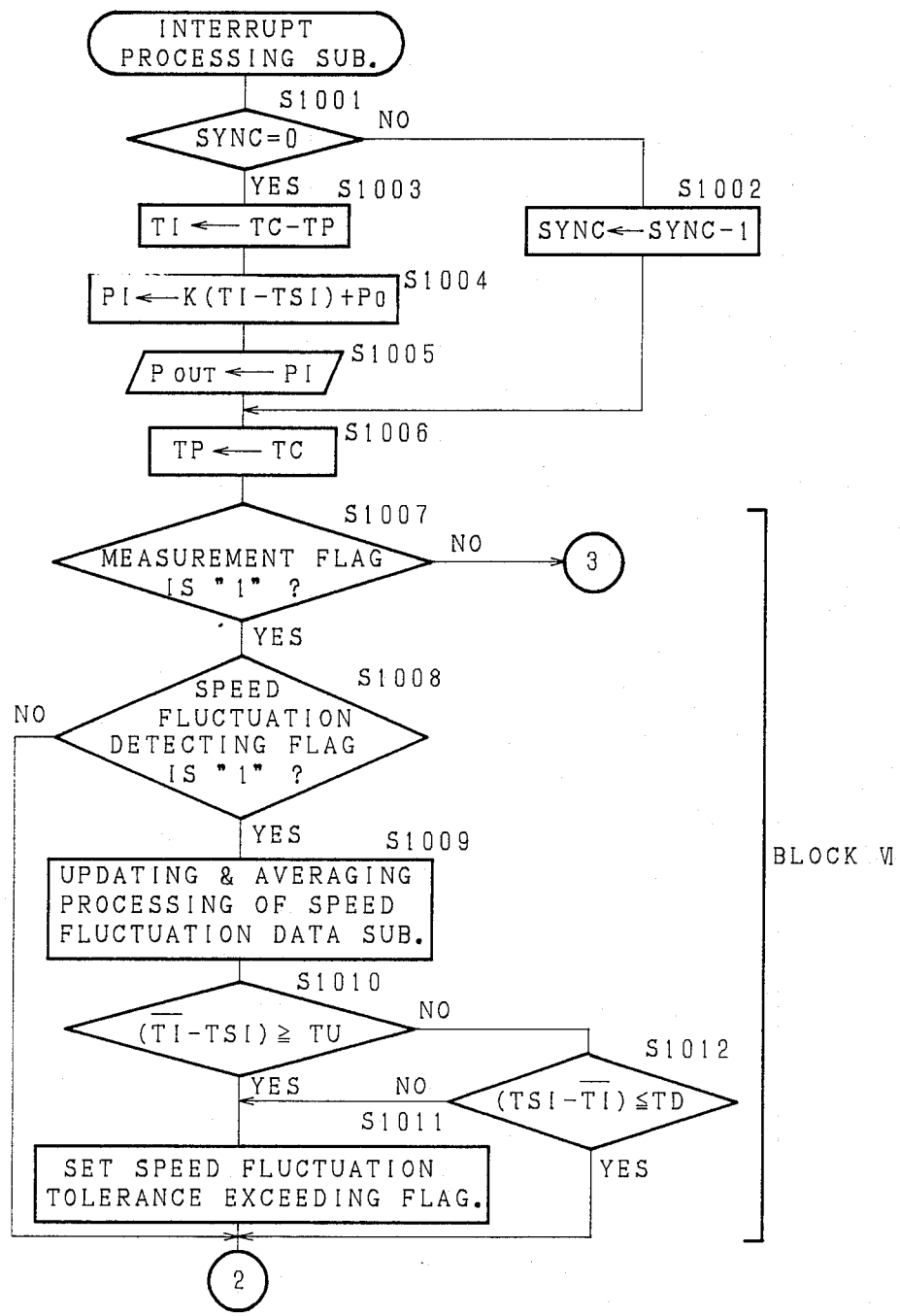
FIGS. 28, 29 are flow charts showing external interrupt-processing routines by encoder pulses in detail.
Figure 29:
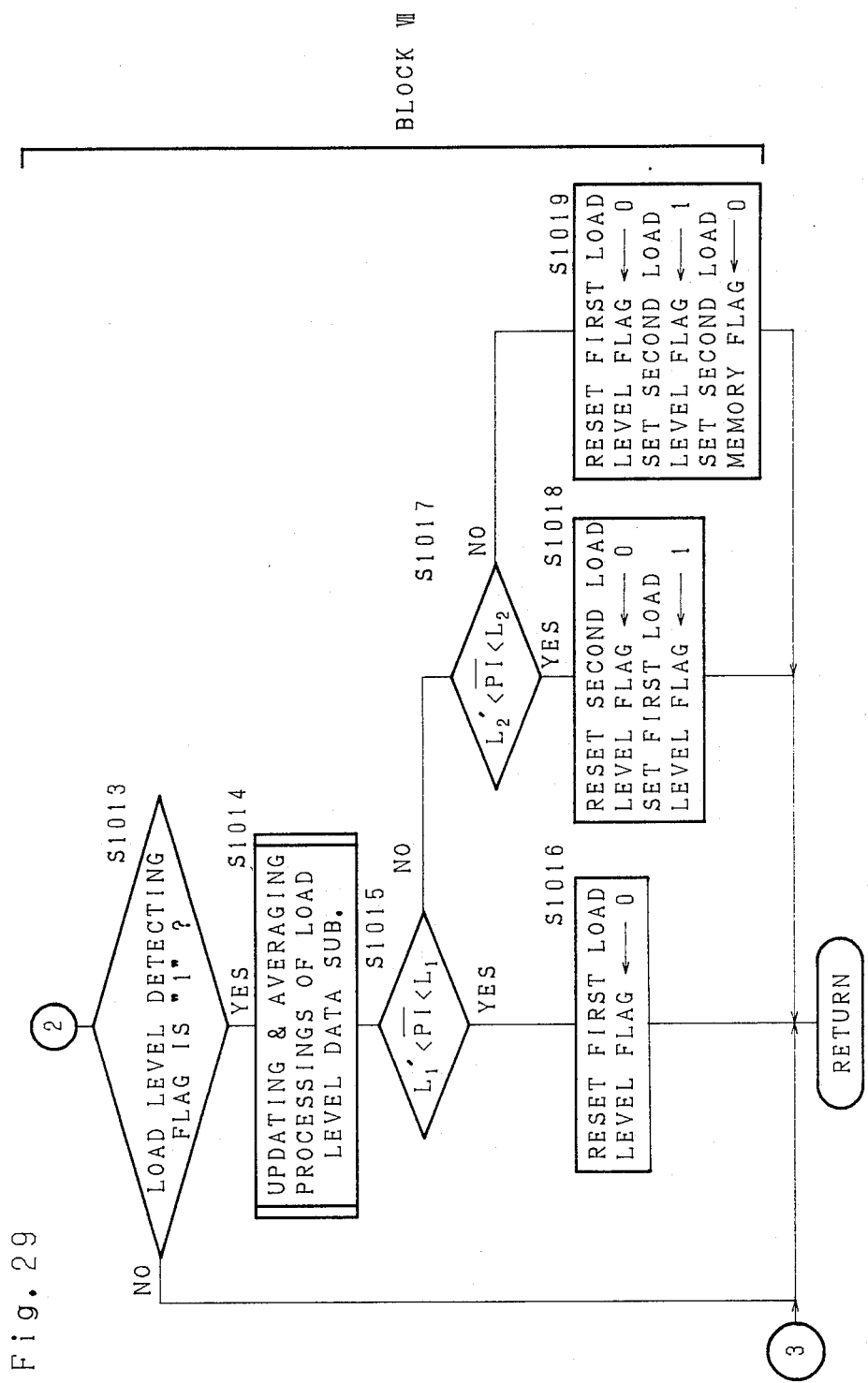

FIGS. 28, 29 show flow charts of external interrupt processing routine by the encoder pulse.

The routine is started when the encoder pulse is inputted to an external interrupt terminal (INT) of the CPU 201 from the DC motor M1.

When the interrupt processing routine is started, first the encoder pulse producing time TC at this time is obtained. Next, the value of counter SYNC is determined in Step S1001. When the value of counter SYNC is other than "0", it proceeds to Step S1002 to subtract "1" from the counter value. The counter SYNC is for synchronizing the encoder pulse and interrupt routine (refer to Step S901), and since at least two pulses are required to obtain pulse intervals of the encoder pulse, it is set for voiding the calculated result of pulse intervals during that period. Then, it proceeds to Step S1006.

While, when it is determined in Step S1001 that the value of counter SYNC is "0", it is determined that the synchronization is completed and it proceeds to Step S1003 to calculate the encoder pulse intervals. The calculation is effected by subtracting the previous encoder pulse producing time TP from the producing time TC thereof at this time. In next Step S1004, the energizing time PI to the motor per unit time is calculated by following Equation, $$PI = K(TI - TSI) + P_0$$

That is, the energizing time PI per unit time is obtained by adding the value obtained by multiplying the coefficient K to the difference between the encoder pulse intervals TI measured and the standard encoder pulse intervals TSI responsive to the target speed, to the energizing time $P_0$ set in advance in responsive to the target speed. Then the motor is energized in Step S1005 responsive to the time PI.

In Step S1006, the previous pulse time is updated by transferring the encoder pulse producing time TC at this time to the register retaining the producing time TP.

In Step S1007, a measurement flag is checked. The measurement flag shows whether or not to measure the data necessary for detecting the speed fluctuation and load level and is raised in Step S842.

When it is determined that the measurement flag is not "1", since data is not required to be measured, following processings are skipped to complete the interrupt processing.

When the measurement flag is determined as "1", it proceeds to Block VI to detect the speed fluctuation, and when the speed fluctuation of the scanning system 1 exceeds the tolerance, processing for setting the speed fluctuation tolerance exceeding flag is performed. That is, in Step S1008, first the speed fluctuation detecting flags is checked to determine whether or not to detect the speed fluctuation.

Figures 30, 31:
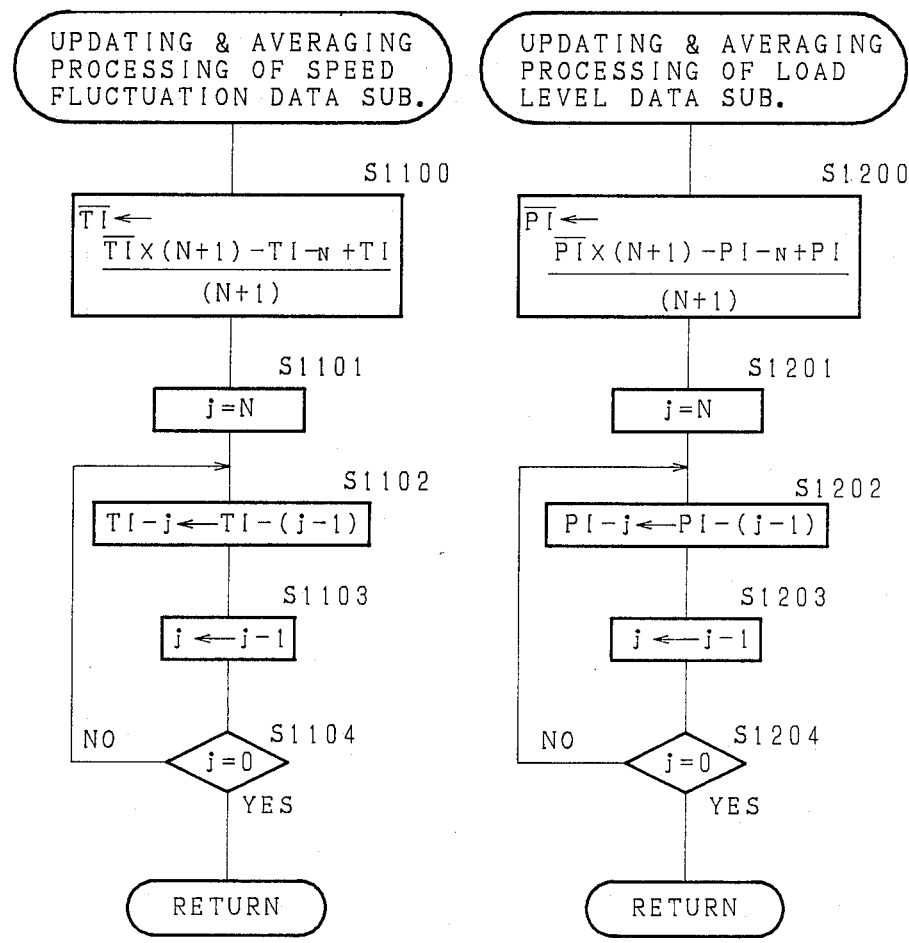
FIG. 30 is a flow chart showing updating and averaging processings of speed fluctuation measured data.
FIG. 31 is a flow chart showing updating and averaging processings of load level detected data.

When the speed fluctuation detecting flag is "1", it proceeds to Step S1009 and performs updating and averaging processings of the speed fluctuation measurement data shown in FIG. 30 to detect the average encoder pulse intervals $\overline{TI}$.

FIG. 30 shows a flow chart illustrating the updating and averaging processings of the speed fluctuation measurement data. In Step S1100, the average value $\overline{TI}$ of encoder pulse intervals of the scanning system 1 is obtained by following Equation, $$\overline{TI} = \{\overline{TI}(N+1) - TI - N + TI\} \div (N+1)$$

Where, N is averaging frequency.

Measurement data for detecting the speed fluctuation are stored in a register $TI-j$ (j=0, 1, 2 ... N) responsive to the value of counter j. $TI-N$ is the past data of (N+1) encoder pulses.

As shown in the above Equation, the average value $\overline{TI}$ is updated by dividing the value obtained by subtracting the oldest measurement data TI−N from a product obtained by multiplying the number of data (N+1) represented by the averaging frequency N to the former average value $\overline{TI}$ and adding the latest measured data TI in place, by the number of data (N+1).

Next, in order to update the measurement data in Steps S1101 through S1104, they are shifted one by one to the register showing the past. That is, in Step S1101, the value of counter j displaying the number of measurement data is set at N and data of the register TI−(j−1) are transferred to the register TI−j successively till the counter j becomes 0 (Steps S1103 through S1104).

In Step S1010, it is determined whether the value obtained by subtracting the value of encoder pulse intervals TSI responsive to the target speed from the value of average encoder pulse intervals $\overline{TI}$ obtained as aforementioned is larger than the speed fluctuation range upper limit value TU. When it is determined smaller in Step S1010, in proceeds to Step S1012 to determine whether the value obtained by subtracting the average encoder pulse intervals $\overline{TI}$ from the value of encoder pulse intervals TSI is smaller than the speed fluctuation range lower limit value TD. If smaller, Step S1011 is skipped and it proceeds to Block VII. While, when a difference ($\overline{TI}$−TSI) between average encoder pulse intervals $\overline{TI}$ and encoder pulse intervals TSI responsive to the target speed is larger than the speed fluctuation range upper limit value TU (corresponding to the case where the moving speed of the scanning system 1 becomes too slow) in Step S1011, or when aforesaid (TSI−$\overline{TI}$) is not smaller than the speed fluctuation range lower limit value TD (corresponding to the case where the moving speed of the scanning system 1 becomes too fast) in Step S1012, it proceeds to Step S1011, so that the speed fluctuation tolerance exceeding flag is set at "1".

When it is determined in Step S1008 that the speed fluctuation detecting flag is "0", processings aforementioned (Steps S1009 through S1012) are skipped and it proceeds to the first Step in Block VII.

In Block VII, in order to detect the load level, processings the same as the updating and averaging processings (Step S1009) of the measurement data for detecting the speed fluctuation in Block VI are executed also for the measurement data for detecting the load level. Thereafter, the state of the load level is decided responsive to the measured result. That is, for determining whether or not to detect the load level, the load level detecting flag is checked in Step S1013. When it is determined that the load level detecting flag is "0", since the load level is not needed to be detected, Steps S1014 through S1019 are skipped to complete the interrupt processing routine.

When it is determined in Step S1013 that the load level detecting flag is "1", it proceeds to Step S1014 to perform updating and averaging processings of the measurement data for detecting the load level. Differences between flow charts shown in FIGS. 30 and 31 are that, $\overline{TI}$ changes to $\overline{PI}$, TI−j to PI−j, TI−(j−1) to PI−(j−1) and measurement data for detecting the speed fluctuation to measurement data for detecting the load level. After executing the same processing as Step S1009 in Step S1014, the load level is decided in Step S1015 responsive to the measured result. First, it is checked in Step S1015 whether the average motor energizing time $\overline{PI}$ is within a range between $L_1'$ and $L_1$ which are values responsive to the first load level. The first load level mentioned herein means a light stress which does not influence the image quality but can shorten the life time of the apparatus, and has a value obtained experimentally in advance by parts-strength or the like as the initial value.

Here, characteristics of the DC motor wherein torque (load torque) produced is, in general, proportional to an electric current consumed is utilized. When it is determined in Step S1015 that the average motor energizing time $\overline{PI}$ is within the ranges of values responsive to the first load level, it proceeds to Step S1016 to reset the first load level flag at "0" and to complete the interrupt processing routine.

While, when it is determined in Step S1015 that the average motor energizing time $\overline{PI}$ is outside the range of first load level values, then it is checked in Step S1017 whether the average motor energizing time $\overline{PI}$ is outside the range of values $L_2'$ and $L_2$ of the second load level.

The second load level mentioned herein means a heavy stress which influences the image quality and shortens the life time of the apparatus considerably, and has a value obtained experimentally in advance.

When it is determined in Step S1017 that the average motor energizing time $\overline{PI}$ is within the range of values of the second load level, it proceeds to Step S1018 to set the first load level flag at "1", and after resetting the second load level flag at "0", completes the interrupt processing routine. When it is determined in Step S1017 that the average motor energizing time $\overline{PI}$ is outside the range of second load level values, it proceeds to Step S1019 to set the second load level flag at "1" and reset the first load level flag at "0", then after setting the second load level memory flag at "1", completes the interrupt processing routine.

V Display Data Set Subroutines

Figure 32:
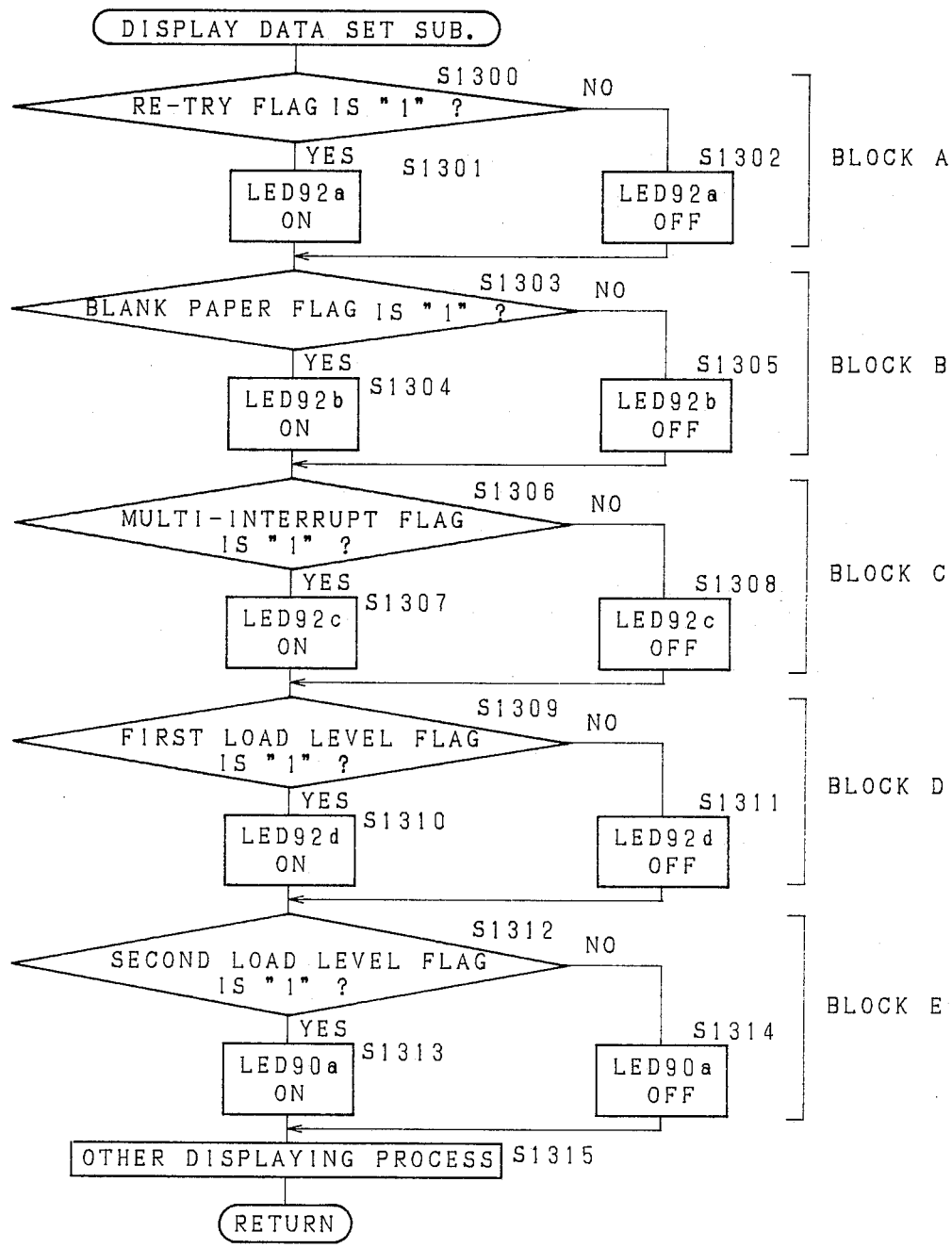
FIG. 32 is a flow chart showing an display data set processing routine in detail.

In a flow chart shown in FIG. 32, in Block A, when the scanning system 1 returns to repeat the copying operation due to the speed fluctuation occurring in a marked degree, it is displayed on the operating panel 100 to repeat the copying operation. In Block B, a displaying processing the same as Block A is performed when copying paper discharged at this time is discharged in blank. In Block C, a displaying processing the same as Block A is performed when the speed fluctuation can not be brought within a tolerance limit, even after repeating a predetermined frequency, and the future multi-copying operation has to be stopped. Furthermore, also in Block D, when the load level of scanning system 1 exceeds the first load level, it is displayed on the operating panel 100, and in Block E, when the load level of scanning system 1 becomes heavier and exceeds the second load level, the same processing as Block D is performed. Finally, other displays such as display data of the number of copying sheets and magnification are set.

That is, in Step S1300, it is determined whether a re-try flag is "1", if it is determined as "1", a re-try displaying LED 92a is ON as the scanning system 1 has to return for repeating the copying operation, since the speed fluctuation has occurred (Step S1301). When it is determined as "0" in Step S1300, since the copying operation is not repeated, it proceeds to Step S1302 to OFF the re-try displaying LED 92a.

Next, in Step S1303, a blank paper flag is checked and when it is "1", it proceeds to Step S1304 to ON a blank paper discharge displaying LED 92b to warn that the copying paper discharged is not transferred and still in blank because the image is deformed due to the speed fluctuation and so on.

When it is determined as "0", the blank paper discharge displaying LED 92b is OFF (Step S1305).

In Step S1306, a multi-interrupt flag is checked and when it is "1", it proceeds to Step S1307, determining that mechanical defects may exist because the speed fluctuation and so on can not be settled even repeating the copying operation for a predetermined number of times, and lights a multi-interrupt displaying LED 92c which indicates that the future copying operation is stopped. When it is determined as "0", the multi-interrupt displaying LED 92c is OFF in Step S1308.

In Step S1309, a first load level flag is checked, if it is "1", it proceeds to Step S1310 to ON a first load level displaying LED 92d, since the load level of the scanning system 1 at present exceeds the first load level. When it is determined as "0", it proceeds to Step S1311 to OFF the first load level displaying LED 92d.

In Step S1312, a second load level flag is checked, if it is "1", it proceeds to Step S1313 to ON a second load level displaying LED 90a as the load level of the scanning system 1 at present exceeds the second load level. When it is determined as "0", it proceeds to Step S1314 to OFF the second load level displaying LED 90a.

Then finally, in Step S1315, other displays such as display data of the number of copying sheets and magnification are set and it returns to the main routine.

As mentioned heretofore, according to the present invention, when speed detecting means detects that the relative moving speed of the original and the light source by the scanning means is outside the tolerance until the feeding means feeds transferring paper to the photosensitive drum after the scanning means starts scanning, feeding of the transferring paper to the photosensitive drum is thereafter controlled by whether or not the original scanning to be detected is repeated for less than a predetermined number of times. That is, if the repeating frequency is less than a predetermined frequency, the transferring paper is not fed but held in place and the scanning is repeated again. Thus, in the original table moving type copying apparatus, a poor image forming caused by, for example, stopping or forcing the original table moving by the user's hand, can be prevented. It is also possible to prevent a poor image forming due to instantaneous voltage fluctuations. When these causes are eliminated, a proper copying image can be formed by repeating the scanning.

When the scanning repeating frequency of the original has reached a predetermined frequency, transferring paper is discharged as it is. Therefore, troubles and awkward jobs to remove copying paper attributable to the transferring paper remained in the copying apparatus can be prevented. Furthermore, waste of toner caused by the toner image formed irregularly on the transferring paper can be saved.

Since the copying paper is discharged as it is (e.g. in the case of white paper it is discharged as the white blank paper), for example, it can be warned to the user that a poor image forming which is not transient may occur. Therefore, when the blank paper is discharged, the user can respond effectively to the causes of the poor image forming.

According to the present invention, the driving torque of a scanning mechanism is detected and a load warning is given when the driving torque is not within a predetermined range.

Therefore, in the original table moving type copying apparatus, when the user applies excessive load to the driving means of the scanning mechanism by adding a force by hand (e.g. when copying a thick and heavy book) or forcing the original table, the load warning is given. Thus, the user can prevent the poor image forming attributable to moving speed fluctuations by, for example, easing the force applied to the original table by hand.

Even when the detected driving torque is not related directly to the poor image forming, by setting a level upon which the load warning is based suitably, the user and service man can find that the load which damages the apparatus is applied, or the driving torque has increased due to mechanical defects such as secular variations. Therefore, it contributes to improvement of the maintenance.

As described in the embodiment, since the level upon which load warning is based can be changed on the operating panel, for example, a fine response is possible responsive to the state of apparatus such as to make the load reference level range strict while the apparatus is new and to moderate it gradually responsive to its secular variations.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An electrophotographic copying apparatus in which an image of an original is copied on a paper, comprising:
   a photosensitive surface moving at a constant speed;
   an optical system for transmitting an image from the original to the photosensitive surface;
   scanning means for relatively moving the original, from a scan start position to a scan end position, the optical system including a light source for illuminating the original so as to project the image of the original onto the photosensitive surface with the scanning means;
   toner image forming means for forming a toner image on the photosensitive surface based on the image projection by said scanning means;
   transfer means for transferring the toner image on the photosensitive surface onto the paper;
   paper transport means for transporting the paper to said transfer means in synchronism with the toner image on the photosensitive surface;
   detection means for detecting a scanning speed of the relative movement of the original by said scanning means;
   re-try means for controlling the operation of said scanning means so that the scanning means tries again to start the relative movement of the original from the scan start position when the scanning speed detected by said detection means exceeds a predetermined range before the paper transport means starts transporting the paper and after the scanning means starts the relative movement of the original, and
   count means for counting the number of the attempts to scan by said re-try means.

2. An electrophotographic copying apparatus as claimed in claim 1, wherein said paper transport means starts transporting the paper to the transfer means when the relative movement of the original reaches a predetermined position.

3. An electrophotographic copying apparatus as claimed in claim 2, wherein said re-try means is activated before the relative movement of the original reaches the predetermined position.

4. An electrophotographic copying apparatus as claimed in claim 1, wherein said re-try means stops the scanning means when the number of attempts to scan counted by said count means exceeds a predetermined number.

5. An electrophotographic copying apparatus as claimed in claim 4, wherein said paper transport means stops transporting the paper to said transfer means so as not to transfer the toner image onto the paper when said re-try means stops the try to scan.

6. An electrophotographic copying apparatus as claimed in claim 1, further comprising, multi-copy controlling means for controlling a multi-copy mode in which plural copies are performed from one original.

7. An electrophotographic copying apparatus as claimed in claim 6, wherein said multi-copy controlling means stops a succeeding control of the multi-copy mode when the number of the try to scan counted by said count means exceeds a predetermined number.

8. An electrophotographic copying apparatus as claimed in claim 1, further comprising, warning means for warning that the scanning speed detected by said detection means exceeds a predetermined range.

9. An electrophotographic copying apparatus as claimed in claim 8, wherein said warning means stops warning when the scanning means newly starts a relative movement of the original.

10. An electrophotographic copying apparatus in which an image of an original is copied on a paper, comprising:
- a photosensitive surface moving at a constant speed;
- an optical system for transmitting an image from the original to the photosensitive surface;
- scanning means for relatively moving the original, from a scan start position to a scan end position, the optical system including a light source for illuminating the original so as to project the image of the original onto the photosensitive surface with the scanning means;
- toner image forming means for forming a toner image on the photosensitive surface based on the image projection by said scanning means;
- transfer means for transferring the toner image on the photosensitive surface onto the paper;
- paper transport means for transporting the paper to said transfer means in synchronism with the toner image on the photosensitive surface;
- detection means for detecting a scanning speed of the relative movement of the original by said scanning means;
- re-try means for controlling the operation of said scanning means so that the scanning means tries again to start the relative movement of the original from the scan start position when the scanning speed detected by said detection means exceeds a predetermined range before the paper transport means starts transporting the paper and after the scanning means starts the relative movement of the original, and
- warning means for providing a warning to a user that the scanning speed detected by said detection means exceeds a predetermined range.

11. An electrophotographic copying apparatus in which an image of an original is copied on a paper, comprising:
- a photosensitive surface moving at a constant speed;
- scanning means for relatively moving the original from a scan start position to a scan end position with respect to a light source for illuminating the original so as to project the image of the original onto the photosensitive surface;
- toner image forming means for forming a toner image on the photosensitive surface based on the image projection by said scanning means;
- transfer means for transferring the toner image on the photosensitive surface onto the paper;
- paper transport means for transporting the paper to said transfer means in synchronism with the toner image on the photosensitive surface;
- detection means for detecting a scanning speed of the relative movement of the original a plurality of times;
- judgement means for judging whether or not the scanning speed detected by said detection means exceeds a predetermined range until the paper transport means starts transporting the paper after the scanning means has started the relative movement of the original, and
- re-try means responsive to said judgement means for causing the scanning means to try again to start the relative movement of the original from the scan start position.

12. An electrophotographic copying apparatus as claimed in claim 11, wherein said detecting means detects a real speed of the relative movement of the original a plurality of times and provides, as the scanning speed, the average value of the real speeds which are detected at the preceding times and the present time.

13. An electrophotographic copying apparatus as claimed in claim 11, wherein said judgement means judges whether or not the scanning speed exceeds the predetermined range at each detection of the scanning speed.

14. An electrophotographic copying apparatus in which an image of an original is copied on a paper, comprising:
- a photosensitive surface moving at a constant speed;
- a motor for relatively moving the original from a scan start position to a scan end position with respect to a light source for illuminating the original so as to project the image of the original onto the photosensitive surface;
- toner image forming means for forming a toner image on the photosensitive surface based on the image projection by said scanning means;
- transfer means for transferring the toner image on the photosensitive surface onto the paper;
- paper transport means for transporting the paper to said transfer means in synchronism with the toner image on the photosensitive surface;
- an encoder connected with the rotary shaft of said motor for producing pulse signals corresponding to the relative movement of the original;
- control means responsive to said pulse signals for detecting a scanning speed of the relative movement of the original and for judging whether or not the detected scanning speed exceeds a predetermined range until the paper transport means starts transporting the paper after the scanning means has started the relative movement of the original, and re-try means responsive to said control means for causing said scanning means to try again to start the relative movement of the original from the scan start position.

15. An electrophotographic copying apparatus in which an image of an original is copied on a paper, comprising:

a photosensitive surface moving at a constant speed;

scanning means for relatively moving the original, from a scan start position to a scan end position, for an optical system including a light source for illuminating the original so as to form an electrostatic latent image according to the image of the original on the photosensitive surface by projection of the image of the original onto the photosensitive surface;

developing means for developing the electrostatic latent image with toner to thereby form a toner image on the photosensitive surface;

transfer means for transferring the toner image on the photosensitive surface onto the paper;

paper transport means for transporting the paper to said transfer means;

detection means for detecting a scanning speed of the relative movement of the original by said scanning means;

control means for controlling said paper transport means so as to start transporting the paper in synchronism with the toner image on the photosensitive surface when the scanning speed detected by said detection means is within a predetermined range;

re-try means for controlling the operation of said scanning means so that the scanning means tries again to start the relative movement of the original from the scan start position when the scanning speed detected by said detection means exceeds the predetermined range before the paper transport means starts transporting the paper after the scanning means starts the relative movement of the original;

count means for counting a number of the try to scan by said re-try means; and re-try stop means for stopping the try to scan when the number of the try to scan counted by said count means exceeds a predetermined number.

16. An electrophotographic copying apparatus as claimed in claim 15, further comprising, multi-copy controlling means for controlling a multi-copy mode in which plural copies are performed from one original.

17. An electrophotographic copying apparatus as claimed in claim 16, wherein said multi-copy controlling means stops a succeeding control of the multi-copy mode when the number of the try to scan counted by said count means exceeds a predetermined number.

18. An electrophotographic copying apparatus as claimed in claim 15, wherein said control means causes the paper transport means to start transporting the paper to the transfer means when the relative movement of the original reaches a predetermined position.

19. An electrophotographic copying apparatus as claimed in claim 18, wherein said re-try means is activated before the relative movement of the original reaches the predetermined position.

20. An electrophotographic copying apparatus as claimed in claim 15, further comprising, erase means for erasing the electrostatic latent image formed on the photosensitive surface when said re-try stop means is activated.

21. An electrophotographic copying apparatus as claimed in claim 20, wherein said control means causes the paper transport means to start transporting the paper to said transfer means in synchronism with a portion erased by said erase means on the photosensitive surface so as not to transfer the toner image onto the paper when said re-try stop means is activated.

22. An electrophotographic copying apparatus as claimed in claim 15, further comprising, warning means for warning that the scanning speed detected by said detection means exceeds the predetermined range.

23. An electrophotographic copying apparatus as claimed in claim 22, wherein said warning means stops warning when the scanning means newly starts the relative movement of the original.

24. An electrophotographic copying apparatus as claimed in claim 15, further comprising, warning means for warning that the number of attempts to scan counted by said count means exceeds the predetermined number.

25. An electrophotographic copying apparatus in which an image of an original is copied on a paper, comprising:

a photosensitive surface moving at a constant speed;

scanning means for relatively moving the original for an optical system including a light source for illuminating the original so as to project the image of the original onto the photosensitive surface;

image forming means for forming a copied image according to the image of the original on the paper based on the image projection by said scanning means;

detection means for detecting a scanning torque of the relative movement of the original by said scanning means;

judgment means for judging whether the scanning torque detected by said detection means exceeds a predetermined range or not; and warning means responsive to the judgment of said judgment means for warning that the scanning torque exceeds a predetermined range.

26. An electrophotographic copying apparatus as claimed in claim 25, wherein said judgment means judges whether the scanning torque detected by said detection means exceeds a first predetermined range and judges whether the scanning torque exceeds a second predetermined range including the first predetermined range therein.

27. An electrophotographic copying apparatus as claimed in claim 26, wherein said warning means has a first device for warning that the scanning torque exceeds the first predetermined range and a second device for warning that the scanning torque exceeds the second predetermined range.

28. An electrophotographic copying apparatus as claimed in claim 25, further comprising, altering means for altering the predetermined range.

* * * * *